US012782925B2

(12) United States Patent
Aggarwal et al.

(10) Patent No.: US 12,782,925 B2
(45) Date of Patent: Nov. 3, 2026

(54) VEHICLE SCHEDULING APPARATUS, CONTROL METHOD, AND NON-TRANSITORY COMPUTER-READABLE STORAGE MEDIUM

(71) Applicant: NEC Corporation, Tokyo (JP)

(72) Inventors: Aayush Aggarwal, Tokyo (JP); Florence Thi Ngoc Loan Ho, Tokyo (JP); Shinji Nakadai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 387 days.

(21) Appl. No.: 18/697,537

(22) PCT Filed: Sep. 28, 2022

(86) PCT No.: PCT/JP2022/036146
§ 371 (c)(1),
(2) Date: Apr. 1, 2024

(87) PCT Pub. No.: WO2023/058517
PCT Pub. Date: Apr. 13, 2023

(65) Prior Publication Data
US 2025/0004455 A1 Jan. 2, 2025

(30) Foreign Application Priority Data
Oct. 7, 2021 (JP) ................................ 2021-165351

(51) Int. Cl.
*G05B 19/41* (2006.01)
*B65G 43/00* (2006.01)
*G05B 19/418* (2006.01)

(52) U.S. Cl.
CPC . *G05B 19/41865* (2013.01); *G05B 19/41895* (2013.01); *B65G 43/00* (2013.01);
(Continued)

(58) Field of Classification Search
None
See application file for complete search history.

(56) References Cited

U.S. PATENT DOCUMENTS 6,323,882 B1 * 11/2001 Jerome ................ H04L 69/329 715/965
11,934,984 B1 * 3/2024 Ben-Arie .......... G06Q 10/0633
(Continued)

FOREIGN PATENT DOCUMENTS

CN 111667212 A 9/2020
JP 2018-151328 A 9/2018
(Continued)

OTHER PUBLICATIONS

Mes et al., "Opportunity costs calculation in agent-based vehicle routing and scheduling", Jan. 2006, (BETA publicatie : working papers; vol. 168). Universiteit Twente. (Year: 2006).*
(Continued)

*Primary Examiner* — Mohammad Ali
*Assistant Examiner* — Kelvin Booker
(74) *Attorney, Agent, or Firm* — Sughrue Mion, PLLC

(57) ABSTRACT

A vehicle scheduling apparatus acquires a task list information that indicates tasks assigned to a target person to whom a target vehicle is assigned. The vehicle scheduling apparatus determines an execution order of the tasks of the target vehicle using a cost matrix that indicates a minimum cost for each pair of sites, selects a path to travel for each task, generates schedule information, and detects a conflict between the target vehicle and a temporary obstacle. When the conflict is detected, the vehicle scheduling apparatus updates the cost matrix so as to update the minimum cost of the pair of sites, and repeatedly generating the schedule information until no detection is detected.

20 Claims, 18 Drawing Sheets

(52) U.S. Cl.
CPC .............. *G05B 2219/32291* (2013.01); *G05B 2219/32423* (2013.01)

(56) References Cited

U.S. PATENT DOCUMENTS

| | | | | |
|---|---|---|---|---|
| 12,443,432 | B2 * | 10/2025 | Enumulapally | G06F 3/04847 |
| 2004/0006415 | A1 * | 1/2004 | Kang | G05B 19/41895 318/587 |
| 2005/0015769 | A1 * | 1/2005 | Gegner | G05B 23/0267 718/100 |
| 2006/0265103 | A1 | 11/2006 | Orita | |
| 2017/0270466 | A1 * | 9/2017 | Kao | G05D 1/0217 |
| 2021/0012284 | A1 * | 1/2021 | Jarvis | G01C 21/206 |
| 2023/0351278 | A1 * | 11/2023 | Larsen | G06Q 10/063114 |

FOREIGN PATENT DOCUMENTS

| | | | | |
|---|---|---|---|---|
| JP | 2021-149216 | A | 9/2021 | |
| WO | WO-2016053695 | A1 * | 4/2016 | G06Q 10/06316 |
| WO | 2021/184265 | A1 | 9/2021 | |

OTHER PUBLICATIONS

Le et al., "Integrating Both Routing and Scheduling Into Motion Planner for Multivehicle System", Mar. 2022, IEEE Canadian Journal of Electrical and Computer Engineering, vol. 46, No. 1, WINTER 2023, (Year: 2022).*

Mahmoudzadeh et al., "Optimal Route Planning with Prioritized Task Scheduling for AUV Missions", 2015 IEEE International Symposium on Robotics and Intelligent Sensors (IEEE IRIS2015). (Year: 2015).*

Wang et al., "Heuristic approaches for solving transit vehicle scheduling problem with route and fueling time constraints", Applied Mathematics and Computation 190 (2007) 1237-1249. (Year: 2007).*

Lyu et al., "Approach to Integrated Scheduling Problems Considering Optimal Number of Automated Guided Vehicles and Conflict-Free Routing in Flexible Manufacturing Systems", Apr. 2019, IEEE Access. (Year: 2019).*

Fazlollahtabar et al., "Hybrid cost and time path planning for multiple autonomous guided vehicles", Jul. 2017, Appl Intell (2018) 48: 482-498. (Year: 2017).*

Gao et al., "Automatic task scheduling optimization and collision-free path planning for multi-areas problem", Mar. 2021, Intelligent Service Robotics (2021) 14:583-596. (Year: 2021).*

Bredstrom et al., "Discrete Optimization Combined vehicle routing and scheduling with temporal precedence and synchronization constraints", European Journal of Operational Research 191 (2008) 19-31. (Year: 2008).*

Aggarwal et al., "Extended Time Dependent Vehicle Routing Problem for Joint Task Allocation and Path Planning in Shared Space" , 2022 IEEE/RSJ International Conference on Intelligent Robots and Systems (IROS) Oct. 23-27, 2022.*

JP Office Action for JP Application No. 2024-519453, mailed on Oct. 22, 2024 with English Translation.

International Search Report for PCT Application No. PCT/JP2022/036146, mailed on Dec. 20, 2022.

English translation of Written opinion for PCT Application No. PCT/JP2022/036146, mailed on Dec. 20, 2022.

Ayoub Insa Correa, Andre Langevin, and Louis-Martin Rousseau, "Scheduling and routing of automated guided vehicles: A hybrid approach", Computers & Operations Research, vol. 34, Issue 6, Jun. 2007, pp. 1688-1707.

Chryssi Malandraki and Mark S. Daskin, "Time Dependent Vehicle Routing Problems: Formulations, Properties and Heuristic Algorithms", Transportation Science, vol. 26, Issue 3, Aug. 1992.

Guni Sharon, Roni Stern, Ariel Felner, and Nathan Sturtevant, "Conflict-Based Search for Optimal Multi-Agent Path Finding", 26th AAAI Conference on Artificial Intelligence, Jul. 22, 2012, pp. 563-569.

Hiroaki Inotsume et al., "Path Negotiation for Self-interested Multirobot Vehicles in Shared Space", 2020 IEEE/RSJ International Conference on Intelligent Robots and Systems (IROS), Feb. 10, 2021, pp. 11587-11594, <URL: https://ieeexplore.ieee.org/stamp/stamp.jsp?tp=&arnumber=9341305> <Doi: 10.1109/IROS45743.2020.9341305>.

* cited by examiner

TIME-DEPENDENT COST MATRIX

TIME-BASED PATH MATRIX

20

| TASK IDENTIFIER (22) | TASK SITE (24) | TASK PATH (26) | START TIME (28) |
|---|---|---|---|
| task001 | S1 | P6 | T1 |
| task003 | S3 | P2 | T3 |
| task002 | S5 | P8 | T7 |
| . . . | . . . | . . . | . . . |

Fig. 10

VEHICLE SCHEDULING APPARATUS, CONTROL METHOD, AND NON-TRANSITORY COMPUTER-READABLE STORAGE MEDIUM

This application is a National Stage Entry of PCT/JP2022/036146 filed on Sep. 28, 2022, which claims priority from Japanese Patent Application 2021-165351 filed on Oct. 7, 2021, the contents of all of which are incorporated herein by reference, in their entirety.

TECHNICAL FIELD

The present disclosure generally relates to a technique to determine, for a vehicle, an execution order of tasks and paths through which the vehicle travel to execute the tasks.

BACKGROUND ART

There are situations where vehicles are used to execute tasks. For example, a logistics company may use automatic guided vehicles (AGVs) to pick up and deliver loads in a warehouse. Each vehicle executes multiple tasks assigned to it in turn while moving around a workspace, e.g., the inside of the warehouse.

In order to manage these vehicles, it is required to determine an execution order of tasks and a route of travel in advance for each vehicle. NPL1 discloses a technique to determine the execution order of tasks and a route of travel for each of multiple vehicles simultaneously.

CITATION LIST

Non Patent Literature

NPL1: Ayoub Insa Correa, Andre Langevin, and Louis-Martin Rousseau, "Scheduling and routing of automated guided vehicles: A hybrid approach", Computers & Operations Research, Volume 34, Issue 6, pp. 1688-1707 June, 2007

NPL2: Chryssi Malandraki and Mark S. Daskin, "Time Dependent Vehicle Routing Problems: Formulations, Properties and Heuristic Algorithms", Transportation Science, Volume 26, Issue 3, pages 185-200, August 1992.

NPL3: Guni Sharon, Roni Stern, Ariel Felner, and Nathan Sturtevant, "Conflict-Based Search for Optimal Multi-Agent Path Finding", 26th AAAI Conference on Artificial Intelligence, Jul. 22, 2012

SUMMARY OF INVENTION

Technical Problem

In NPL1, the execution order of tasks and the route for travel are determined for multiple vehicles simultaneously. Thus, when a new vehicle is added, it is necessary to determine the execution order of tasks and the route for travel for all vehicles again, not only for the newly added vehicle. An objective of this disclosure is to provide a novel technique to determine the execution order of tasks and the route for travel for a vehicle that executes tasks.

Solution to Problem

The present disclosure provides a vehicle scheduling apparatus that comprises at least one processor and memory storing instructions. The at least one processor is configured to execute the instructions to: acquire a task list information that indicates tasks assigned to a target person to whom at least one target vehicle is assigned, the target vehicle executing each task assigned thereto at a task site corresponding to the task; determine an execution order of the tasks for each target vehicle by solving a vehicle routing problem using a cost matrix that indicates a minimum cost for each pair of sites in a workspace; select a task path for each task that is a path with minimum cost to travel to the task site of the task based on the determined execution order of the tasks; generate, for each target vehicle, schedule information of the target vehicle that indicates the execution order of the tasks assigned to the target vehicle and the task path for each task; detect an external conflict that is a conflict between the target vehicle and a temporary obstacle whose location varies over time; and in the case where one or more external conflicts are detected, further perform: updating the cost matrix so as to update the minimum cost of the pair of sites between whom the conflict is detected; and repeatedly performing the determination of the execution order of the tasks, the selection of the task path for each task, the generation of the schedule information, the detection of the conflict, and the update of the cost matrix until no detection between the target vehicle and the temporary obstacle is detected.

The present disclosure provides a control method performed by a computer. The control method comprises: acquiring a task list information that indicates tasks assigned to a target person to whom at least one target vehicle is assigned, the target vehicle executing each task assigned thereto at a task site corresponding to the task; determining an execution order of the tasks for each target vehicle by solving a vehicle routing problem using a cost matrix that indicates a minimum cost for each pair of sites in a workspace; generating, for each target vehicle, schedule information of the target vehicle that indicates the execution order of the tasks assigned to the target vehicle and the task path for each task; detecting an external conflict that is a conflict between the target vehicle and a temporary obstacle whose location varies over time; and in the case where one or more external conflicts are detected, further performing: updating the cost matrix so as to update the minimum cost of the pair of sites between whom the conflict is detected; and repeatedly performing the determination of the execution order of the tasks, the selection of the task path for each task, the generation of the schedule information, the detection of the conflict, and the update of the cost matrix until no detection between the target vehicle and the temporary obstacle is detected.

The present disclosure provides a non-transitory computer readable storage medium storing a program that causes a computer to execute the control method of the present disclosure described above.

Advantageous Effects of Invention

According to the present disclosure, a novel technique to determine the execution order of tasks and the route for travel for a vehicle that executes tasks is provided.

BRIEF DESCRIPTION OF DRAWINGS

FIG. 10 illustrates the schedule information in a table format.

DESCRIPTION OF EMBODIMENTS

Example embodiments according to the present disclosure will be described hereinafter with reference to the drawings. The same numeral signs are assigned to the same elements throughout the drawings, and redundant explanations are omitted as necessary. In addition, a storage unit is formed with one or more storage devices.

First Example Embodiment

Overview

Figure 1:
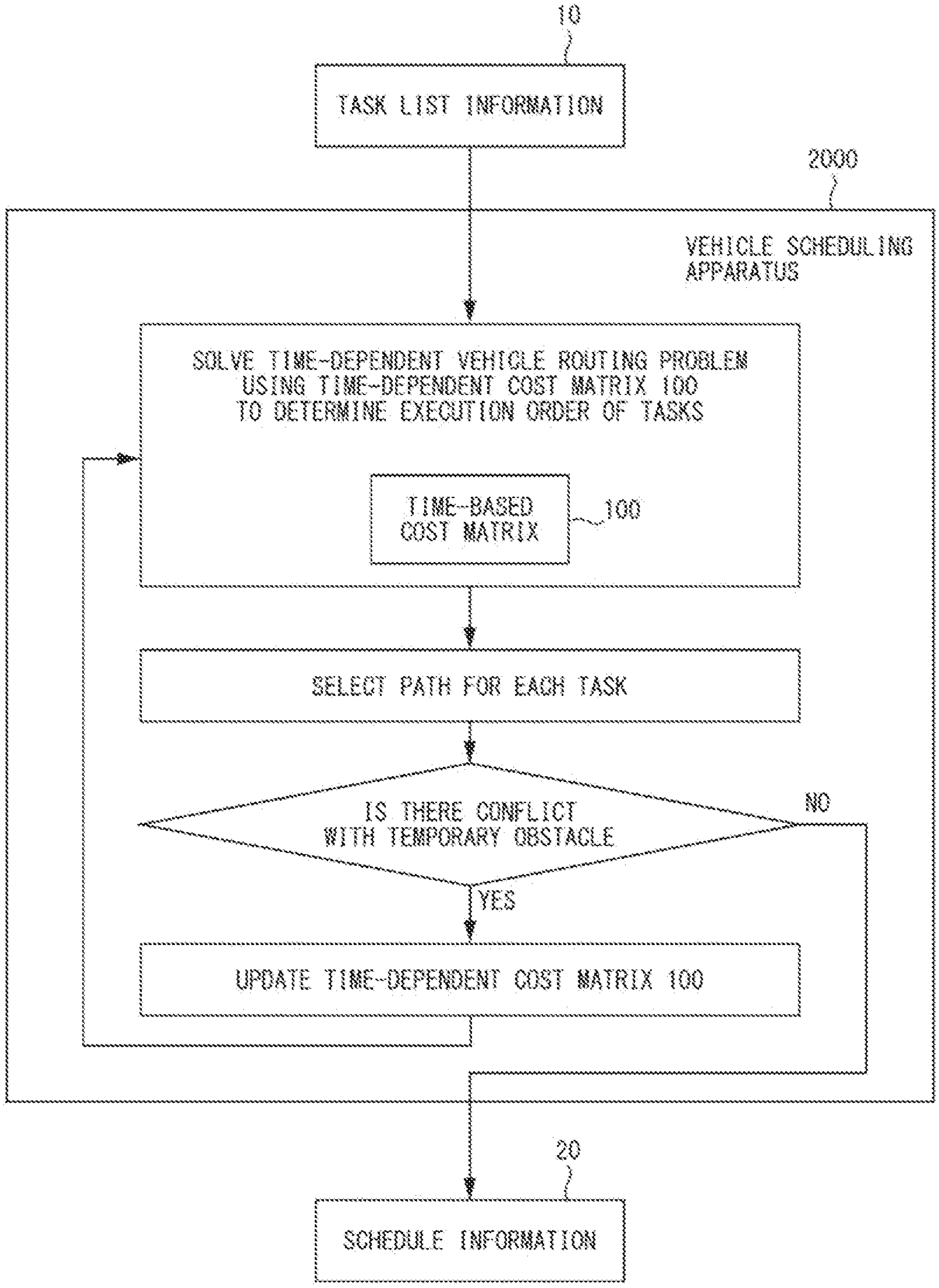
FIG. 1 illustrates an overview of the apparatus of the first example embodiment.

FIG. 1 illustrates an overview of the vehicle scheduling apparatus 2000 of the first example embodiment. Note that the overview illustrated by FIG. 1 shows an example of operations of the vehicle scheduling apparatus 2000 to make it easy to understand the vehicle scheduling apparatus 2000, and does not limit or narrow the scope of possible operations of the vehicle scheduling apparatus 2000.

The vehicle scheduling apparatus 2000 acquires a task list information 10, and generates schedule information 20 from the task list information 10. The task list information 10 indicates tasks that are assigned to a target person, such as an operator of a vehicle. The target person is a person for which the vehicle scheduling apparatus 2000 generates the schedule information 20. Hereinafter, a vehicle assigned to the target person is called a target vehicle. The schedule information 20 indicates an execution schedule of tasks (more detailed explanation will be described later).

The target vehicle may be arbitrary type of autonomous vehicle, such as an automatic guided vehicle (AGV), a drone, and so on. However, the target vehicle is not necessarily autonomous vehicle, and may be arbitrary type of vehicle that is manually operated by the target person.

The target vehicle is configured to move around a workspace to execute the assigned tasks. The workspace is arbitrary place in which the target vehicle can move around to execute tasks. For example, the workspace is a warehouse, an airport, and so on. The workspace includes multiple sites at which the target vehicle may execute a task. Hereinafter, the site at which a task is executed is called a task site of the task.

There may be various types of tasks that are executed by the target vehicle. For example, the task may be a pick-up of a load to be delivered, a delivery of a load, an inspection of an equipment, a repair of an equipment, and so on. Since each task has to be executed at a specified site (i.e., its task site), the target vehicle is required to travel to the task site for executing the task. Note that the task is not necessarily executed only by the target vehicle, and may be executed in collaboration with an operator or the like. For example, the target vehicle delivers the load to the task site, and an operator unloads the load from the target vehicle.

As mentioned above, the schedule information 20 indicates the execution schedule of tasks. Since the tasks are executed by moving around the warehouse 40, the execution schedule of tasks is represented by an execution order of tasks and a path for traveling to each task site (hereinafter, called task path). There may be one or more paths between sites. The task path of a task is a path with minimum cost of the possible paths to the task site of the task from the task site of the previous task through which the target vehicle is scheduled to travel.

Figure 2:
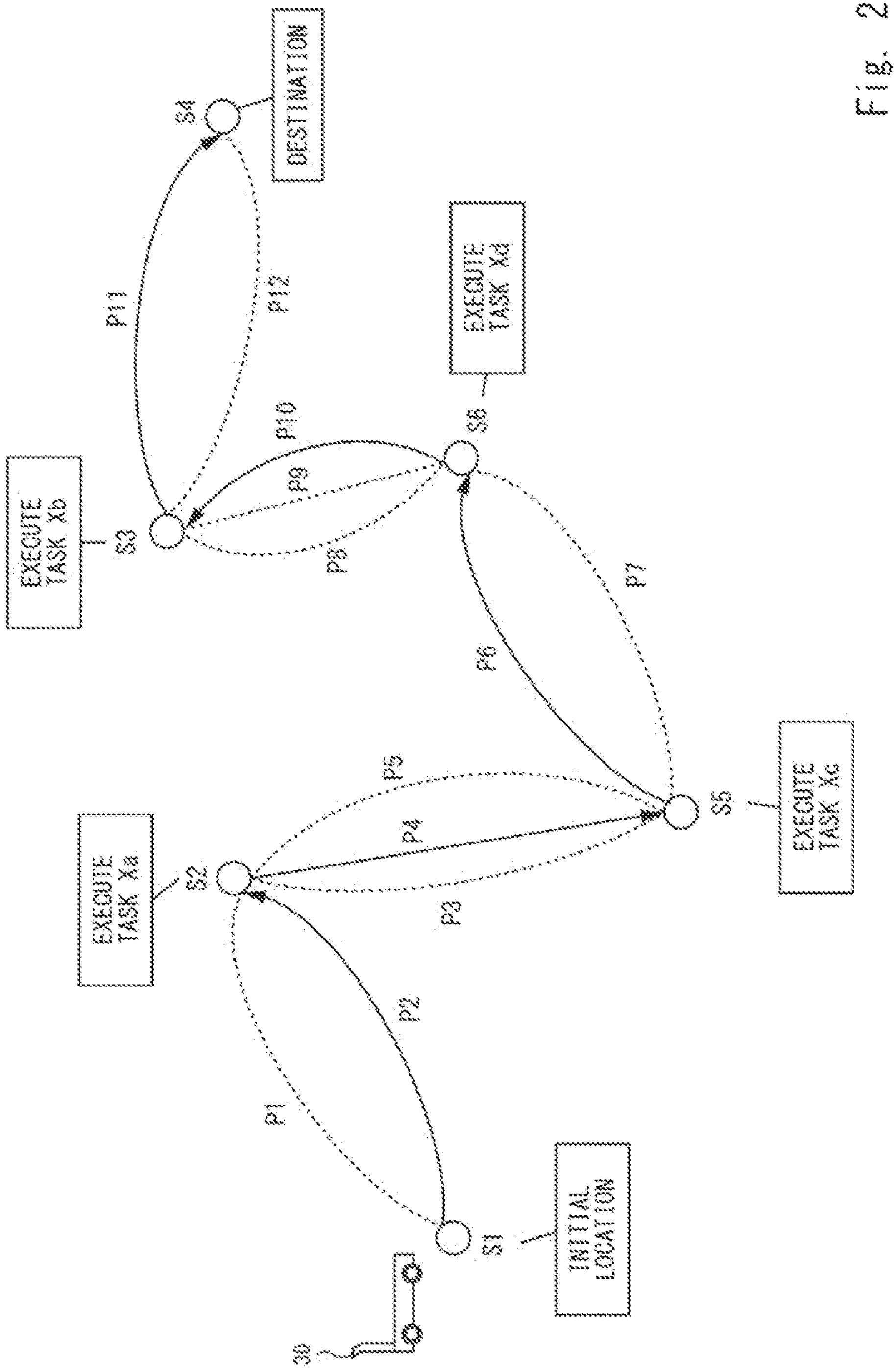
FIG. 2 illustrates an example of the execution schedule of tasks.

FIG. 2 illustrates an example of the execution schedule of tasks. In this example, the target vehicle 30 is located at the site S1 first, and has to be located at the site S4 last. There are four tasks to be executed: a task Xa, Xb, Xc, and Xd that are to be executed at the sites S2, S3, S5, and S6 respectively. The vehicle scheduling apparatus 2000 determines the execution order of tasks as being "Xa→Xc→Xd→Xb". Thus, the order of sites visited by the target vehicle 30 is determined as being "S1→S2→S5→S6→S3→S4". Then, the vehicle scheduling apparatus 2000 selects P2, P4, P6, and P10 as the task path of the tasks Xa, Xc, Xd, and Xb respectively. In addition, the path P11 is selected for the travel from the site S3 to S4. As a result, the schedule information 20 is generated to represent an execution schedule of: 1) traveling from the site S1 to the site S2 through the path P2 and executing the task Xa; 2) traveling from the site S2 to the site S5 through the path P4 and executing the task Xc; 3) traveling from the site S5 to the site S6 through the path P6 and executing the task Xd; 4) traveling from the site S6 to the site S3 through the path P10 and executing the task Xb; and 5) traveling from the site S3 to the site S4.

To generate the schedule information 20, the vehicle scheduling apparatus 2000 determines an execution order of the tasks of the target vehicle 30, and selects the task path for each task. The execution order of the tasks is determined by solving a vehicle routing problem (VRP) using a cost matrix. Note that a VRP is a generalization of a travelling salesman problem (TSP) where more than one vehicle can be handled. Thus, in the case where the number of vehicles is one, a problem solved to determine the execution order of tasks can also be called a TSP.

In this example embodiment, a time-dependent VRP (TDVRP) is employed to generate the schedule information 20. The time-dependent VRP can handle time-dependent costs: a cost of travel for each pair of sites varies over time. Thus, in this example embodiment, the cost matrix is called a time-dependent cost matrix 100 and shows a cost of travel for each pair of the sites and for each point of time. The cost associated with a pair of sites in the time-dependent cost matrix 100 is the cost of the path with minimum cost of the possible paths of that pair. Note that the terms "time-dependent cost matrix 100" and "cost matrix 100" are used interchangeably in this example embodiment.

After determining the execution order of the tasks, the vehicle scheduling apparatus 2000 selects the task path out of possible paths for each task. For each task, a path with minimum cost is selected as the task path. The vehicle scheduling apparatus 2000 generates the schedule information using the result of the determination of the execution order of the tasks and the task path for each task.

Before fixing the schedule information 20 of the target vehicle 30, the vehicle scheduling apparatus 2000 further takes a conflict between the target vehicle 30 and a temporary obstacle into account. The temporary obstacle is an obstacle that occupies a certain area of the workspace during a certain period of time. For example, a vehicle other than the target vehicle 30 could be a temporary obstacle. In another example, a person performs some operations in the workspace could also be a temporary obstacle.

The schedule information 20 of the target vehicle 30 could show the execution schedule of the tasks with which the target vehicle 30 conflicts with a temporary obstacle. Thus, the vehicle scheduling apparatus 2000 repeatedly generates the schedule information 20 taking the conflicts into account until the schedule information 20 shows a conflict-free schedule.

Specifically, after generating the schedule information 20, the vehicle scheduling apparatus 2000 checks whether or not the target vehicle 30 conflicts with a temporary obstacle. In the case where a conflict is detected, the vehicle scheduling apparatus 2000 generates the schedule information 20 again taking the detected conflicts into account. In the case where no conflict is detected, the vehicle scheduling apparatus 2000 terminates the generation of the schedule information 20 (in other words, the schedule information of the target vehicle 30 is fixed).

The influence of the conflicts is taken into consideration by updating the time-dependent cost matrix 100 based on the detected conflicts. Specifically, the cost of a path indicated by the time-dependent cost matrix 100 could become not minimum due to the conflict. Thus, the time-dependent cost matrix 100 is updated to indicate a path with minimum cost for each pair of sites based on the detected conflicts.

The vehicle scheduling apparatus 2000 solves a TDVRP again using the updated cost matrix 100 to determine the execution order of the tasks for the target vehicle 30. Since the detected conflicts are reflected on the cost matrix 100, a solution of the TDVRP shows an execution order of the tasks with which the target vehicle 30 may avoid occurrence of the detected conflicts.

Example of Advantageous Effect

According to the vehicle scheduling apparatus 2000, the execution schedule of the tasks of the target vehicle 30 is repeatedly updated until the target vehicle does not conflict any temporary obstacle, such as other vehicles. In this way, since the execution schedule of the tasks of the target vehicle 30 is determined taking the execution schedules of the tasks of other vehicles that was already fixed into account, it is not necessary to re-generate the execution schedules of the tasks of other vehicles. In other words, the execution schedule of the tasks of each vehicle can be generated on first come first reserve basis. Therefore, it is possible to efficiently generate the execution schedule of the tasks of each vehicle. In addition, the vehicle scheduling apparatus 2000 of the first example embodiment is likely to generate the schedule information 20 with which the target vehicle 30 can work more cost-efficiently than that of the second example embodiment since TDVRP is likely to provide more cost-efficient solution than a VRP with time-independent costs that is employed in the vehicle scheduling apparatus 2000 of the second example embodiment.

Hereinafter, more detailed explanation of the vehicle scheduling apparatus 2000 will be described.

<Example of Functional Configuration>

Figure 3:
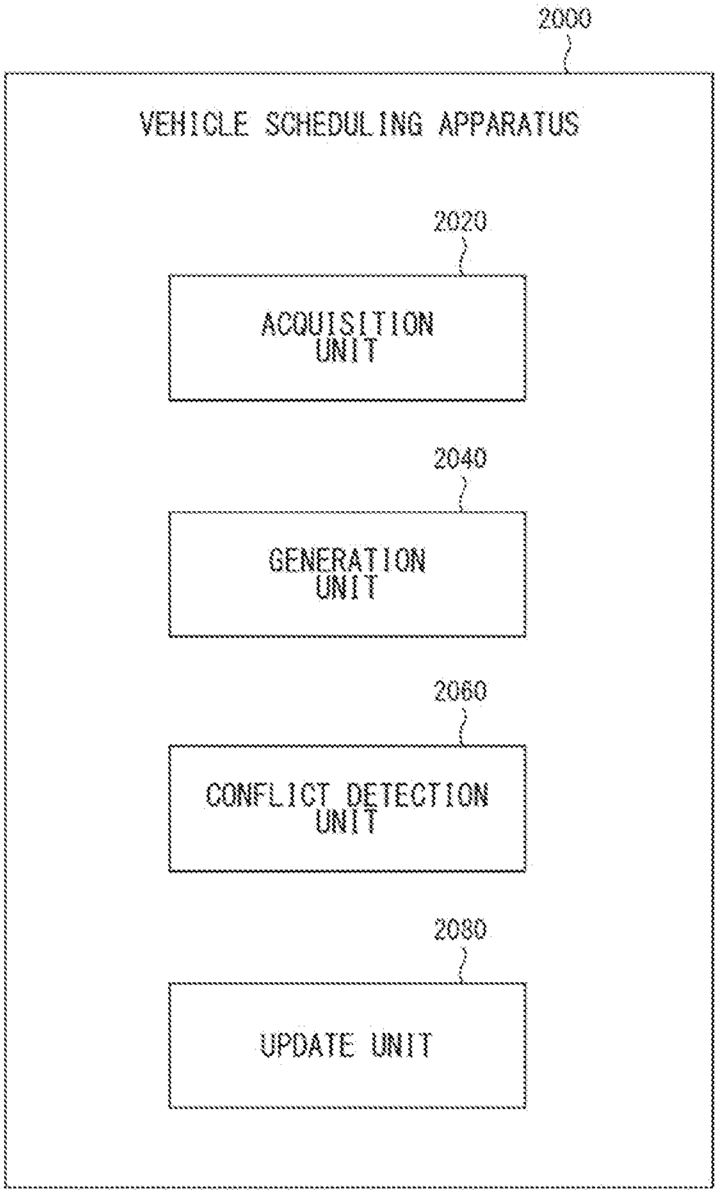
FIG. 3 is a block diagram illustrating an example of a functional configuration of the vehicle scheduling apparatus.

FIG. 3 illustrates an example of a functional configuration of the vehicle scheduling apparatus 2000. The vehicle scheduling apparatus 2000 includes an acquisition unit 2020, generation unit 2040, a conflict detection unit 2060, and an update unit 2080. The acquisition unit 2020 acquires the task list information 10. The generation unit 2040 determines the execution order of tasks by solving a TDVRP with the time-dependent cost matrix 100 and selects the task path for each task, thereby generating the schedule information 20. The conflict detection unit 2060 detects a conflict with the target vehicle 30 and a temporary obstacle. In the case where the conflict is detected, the update unit 2080 updates the time-dependent cost matrix 100 based on the detected conflict. The generation of the schedule information 20, the conflict detection, and the update of the cost matrix 100 are repeatedly performed until no conflict is detected.

<Example of Hardware Configuration>

The vehicle scheduling apparatus 2000 may be realized by one or more computers. Each of the one or more computers may be a special-purpose computer manufactured for implementing the vehicle scheduling apparatus 2000, or may be a general-purpose computer like a personal computer (PC), a server machine, or a mobile device.

The vehicle scheduling apparatus 2000 may be realized by installing an application in the computer. The application is implemented with a program that causes the computer to function as the vehicle scheduling apparatus 2000. In other words, the program is an implementation of the functional units of the vehicle scheduling apparatus 2000.

Figure 4:
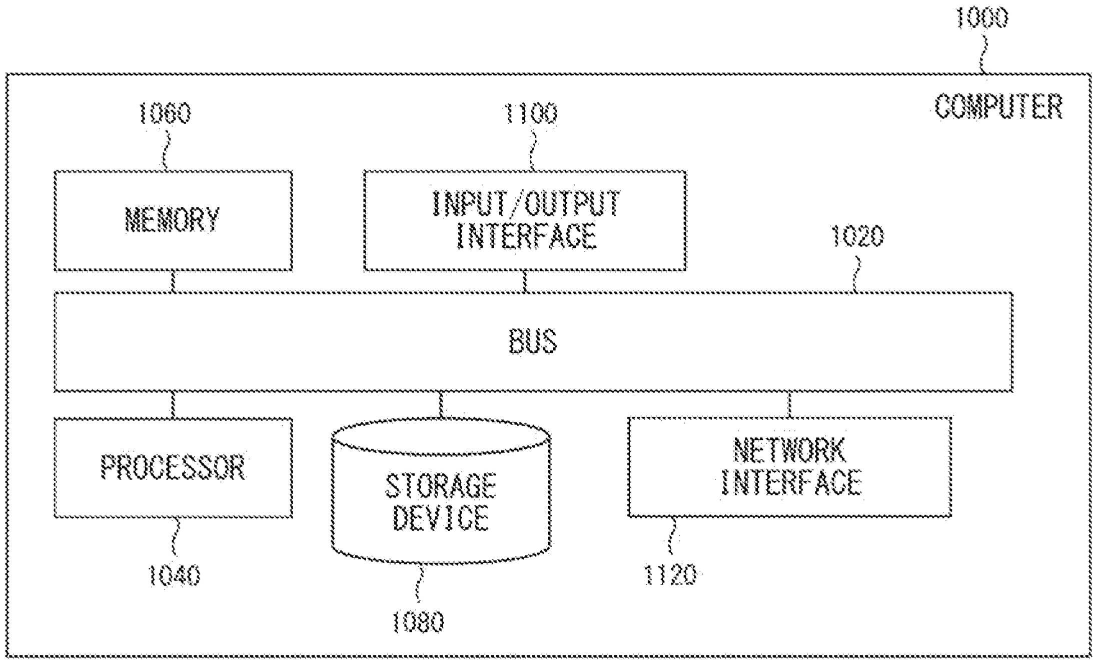
FIG. 4 is a block diagram illustrating an example of the hardware configuration of a computer realizing the vehicle scheduling apparatus.

FIG. 4 is a block diagram illustrating an example of the hardware configuration of a computer 1000 realizing the vehicle scheduling apparatus 2000. In FIG. 4, the computer 1000 includes a bus 1020, a processor 1040, a memory 1060, a storage device 1080, an input/output interface 1100, and a network interface 1120.

The bus 1020 is a data transmission channel in order for the processor 1040, the memory 1060, the storage device 1080, and the input/output interface 1100, and the network interface 1120 to mutually transmit and receive data. The processor 1040 is a processer, such as a CPU (Central Processing Unit), GPU (Graphics Processing Unit), or FPGA (Field-Programmable Gate Array). The memory 1060 is a primary memory component, such as a RAM (Random Access Memory) or a ROM (Read Only Memory). The storage device 1080 is a secondary memory component, such as a hard disk, an SSD (Solid State Drive), or a memory card. The input/output interface 1100 is an interface between the computer 1000 and peripheral devices, such as a keyboard, mouse, or display device. The network interface 1120 is an interface between the computer 1000 and a network. The network may be a LAN (Local Area Network) or a WAN (Wide Area Network).

The storage device 1080 may store the program mentioned above. The CPU 1040 executes the program to realize each functional unit of the vehicle scheduling apparatus 2000.

The hardware configuration of the computer 1000 is not limited to the configuration shown in FIG. 4. For example, as mentioned-above, the vehicle scheduling apparatus 2000 may be realized by plural computers. In this case, those computers may be connected with each other through the network.

<Flow of Process>

Figure 5:
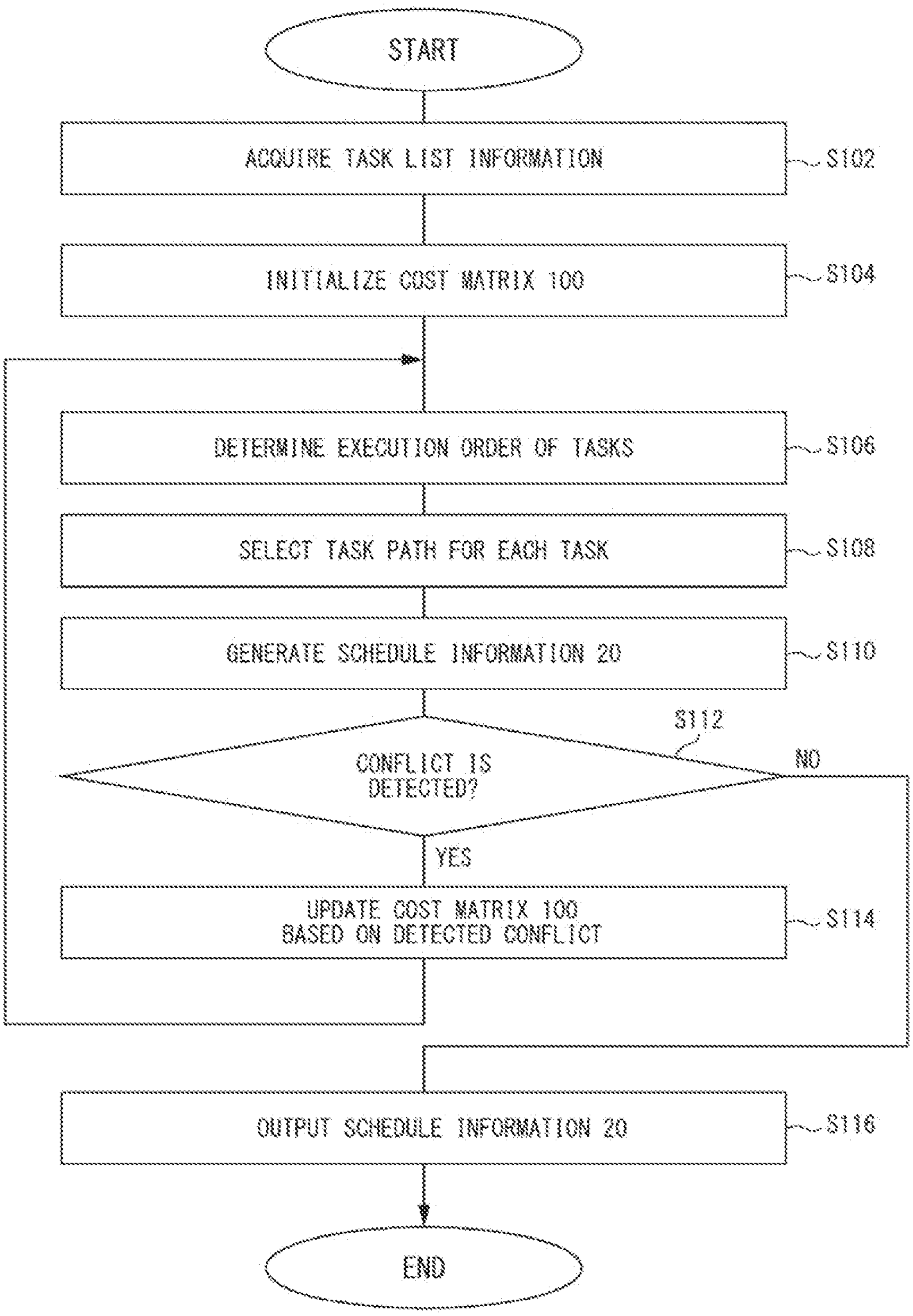
FIG. 5 is a flowchart illustrating an example of a process performed by the vehicle scheduling apparatus of the first example embodiment.

FIG. 5 is a flowchart illustrating an example of a process performed by the vehicle scheduling apparatus 2000. The acquisition unit 2020 acquires the task list information 10 (S102). The generation unit 2040 initializes the time-dependent cost matrix 100 (S104). The generation unit 2040 determines the execution order of tasks using the time-dependent cost matrix 100 (S106). The generation unit 2040 selects the task path for each task (S108). The generation unit 2040 generates the schedule information 20 (S110). The conflict detection unit 2060 performs the conflict detection using the schedule information 20 (S112). In the case where the conflict is not detected (S112: NO), the vehicle scheduling apparatus 2000 outputs the schedule information 20 (S116).

On the other hand, in the case where the conflict is detected (S112: YES), the update unit 2080 updates the time-dependent cost matrix 100 based on the detected conflict (S114).

After the update of the time-dependent cost matrix 100, the process of the vehicle scheduling apparatus 2000 goes back to Step S106. By doing so, the generation of the schedule information 20 (S106 to S110), the conflict detection (S112), and the update of the cost matrix 100 (S114) are repeatedly performed until no conflict is detected at Step S112 (in other words, until the schedule information 20 of the target vehicle 30 shows a conflict-free schedule).

<Acquisition of Task List Information: S102>

The acquisition unit 2020 acquires the task list information 10 (S102). Task list information 10 indicates the tasks that are assigned to the target person of the target vehicle 30. Here, it is assumed that the target person is assigned a single target vehicle 30 to execute her or his tasks. Thus, all of the tasks shown by the task list information 10 of the target person are assigned to a single target vehicle 30. The case where the target person is assigned multiple vehicles will be described later.

The task list information 10 may be prepared for each target person in advance. Specifically, each task list information 10 is prepared in association with an identifier of the target person corresponding to it. Thus, the acquisition unit 2020 acquires the task list information 10 that is associated with the identifier of the target person of the target vehicle 30.

Figure 6:
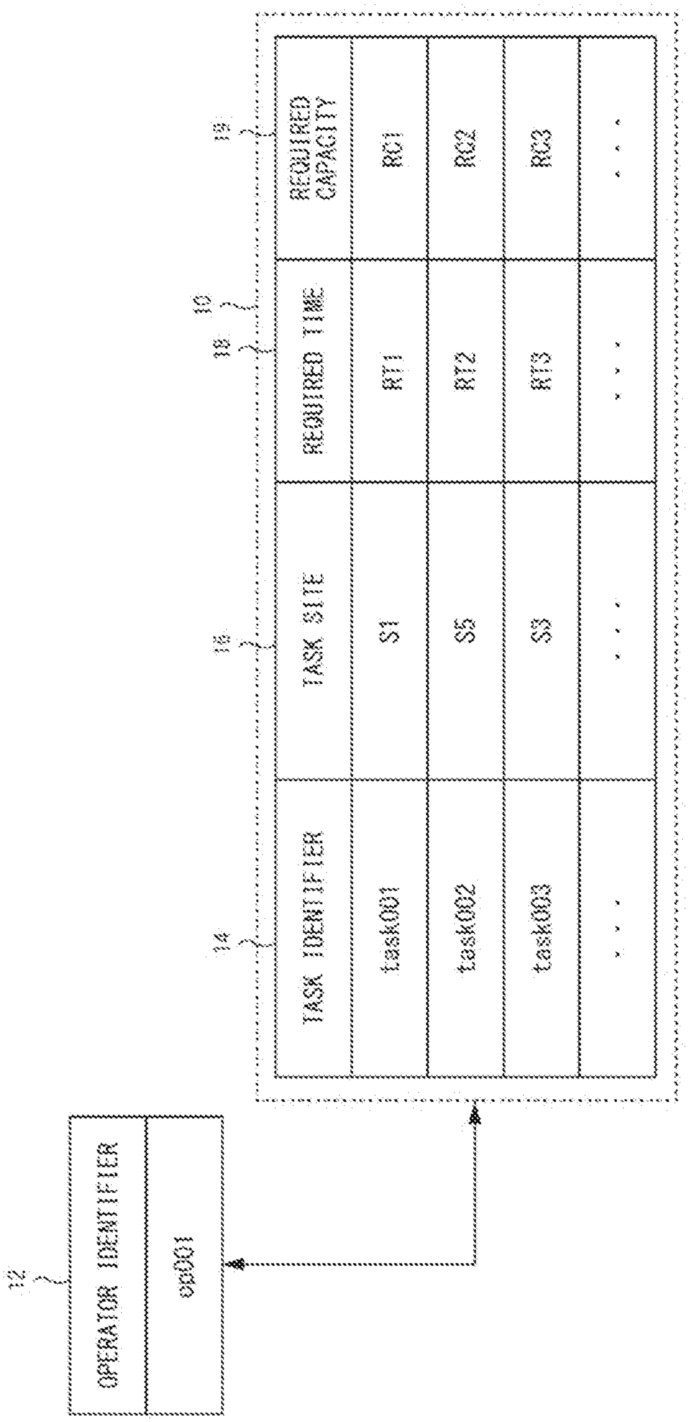
FIG. 6 illustrates the task list information in a table format.

FIG. 6 illustrates the task list information 10 in a table format. The task list information 10 is associated with an operator identifier 12, which is an identifier of the target person. The task list information 10 includes a task identifier 14, a task site 16, a required time 18, and a required capacity 19.

The task identifier 14 indicates the identifier of the task. The task site 16 indicates the task site of the task. In the case where the task is a pick-up of a load, the task site 16 indicates the site to which the target vehicle 30 travel and at which the target vehicle 30 picks up the load. The required time 18 indicates an estimated length of time for which the target vehicle 30 has to stay at the task site to execute the task. In the case where the task is a pick-up of a load, the required time 18 may indicate the time required for the target vehicle 30 to pick up the load at the task site. The required capacity 19 indicates how much capacity is required for the target vehicle 30 to perform the task. For example, in the case where the task is a pick-up of a load, the required capacity 19 may indicate the amount of the load to be delivered. Note that in the case where the number of the target vehicle 30 is one, the capacity of the target vehicle 30 is required to be larger than the maximum value of the required capacities 19 shown by the task list information 10. Also note that in the case where it is not necessary to consider the capacity of the target vehicle 30 (e.g., when it is sure in advance that the capacity of the target vehicle 30 is much larger than the amount of load to be delivered), the task list information 10 is not required to indicate the required capacity 19.

There may be various ways for the acquisition unit 2020 to acquire the task list information 10. For example, the task list information 10 is stored in advance in association with the identifier of the target person in a storage unit to which the vehicle scheduling apparatus 2000 has access. In this case, the acquisition unit 2020 acquires, from the storage unit, the task list information 10 that is associated with the identifier of the target person of the target vehicle 30. Note that the acquisition unit 2020 acquires the identifier of the target person of the target vehicle 30 in arbitrary manner, such as receiving a user input that specifies the identifier of the target person of the target vehicle 30.

In another example, the acquisition unit 2020 may acquire the task list information 10 by receiving it that is sent from another computer, such as a mobile device or a PC operated by the target person of the target vehicle 30.

<Initialization of Time-Dependent Cost Matrix 100: S104>

Figure 7:
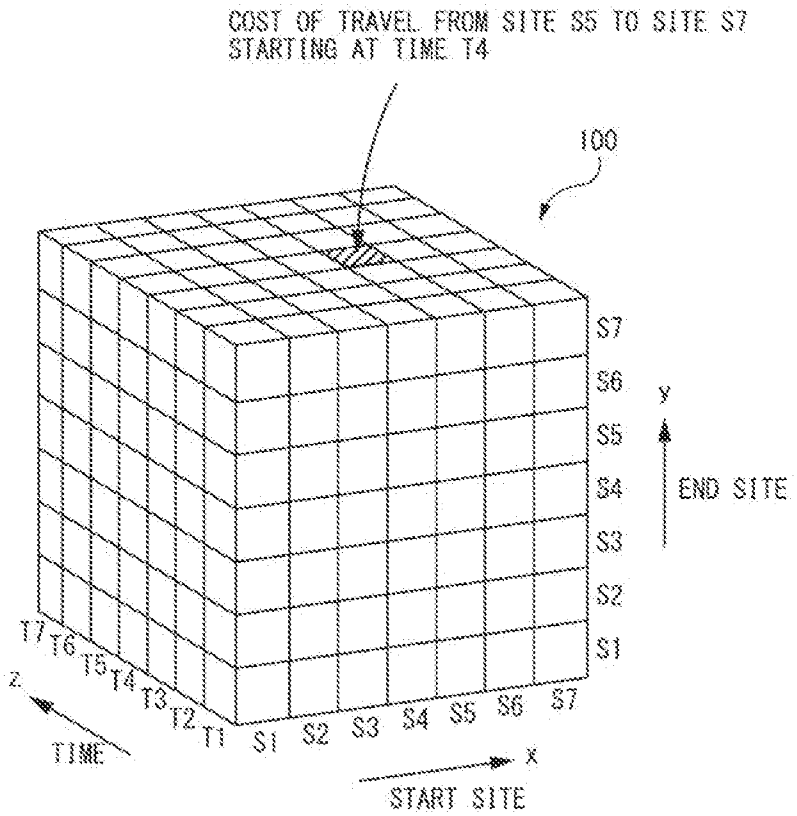
FIG. 7 illustrates the time-dependent cost matrix.

The generation unit 2040 initializes the time-dependent cost matrix 100 (S104). The time-dependent cost matrix 100 shows a minimum cost of travel for each pair of sites and for each point of time. FIG. 7 illustrates the time-dependent cost matrix 100. The time-dependent cost matrix 100 may be a three-dimensional matrix; the first index (x-coordinate) of a cell represents the start site of travel, the second index (y-coordinate) of a cell represents the end site of travel, and the third index (z-coordinate) of a cell represents a point of time, respectively.

The cell (Si, Sj, Tk) of the cost matrix 100 may indicate the minimum cost of travel from the site Si to the site Sj with the start time of travel being Tk. For example, the coordinate of the cell filled with diagonal lines shown by FIG. 7 is (S5, S7, T4). Thus, the value indicated by this cell indicates the minimum cost of travel from the site S5 to S7 with the start time of travel T4.

In order to initialize the time-dependent cost matrix 100, it is required to figure out a path with minimum cost for each pair of sites and for each point of time. To do so, the generation unit 2040 may first initialize a time-dependent path matrix that shows a path with minimum cost for each pair of sites and for each point of time.

Figure 8:
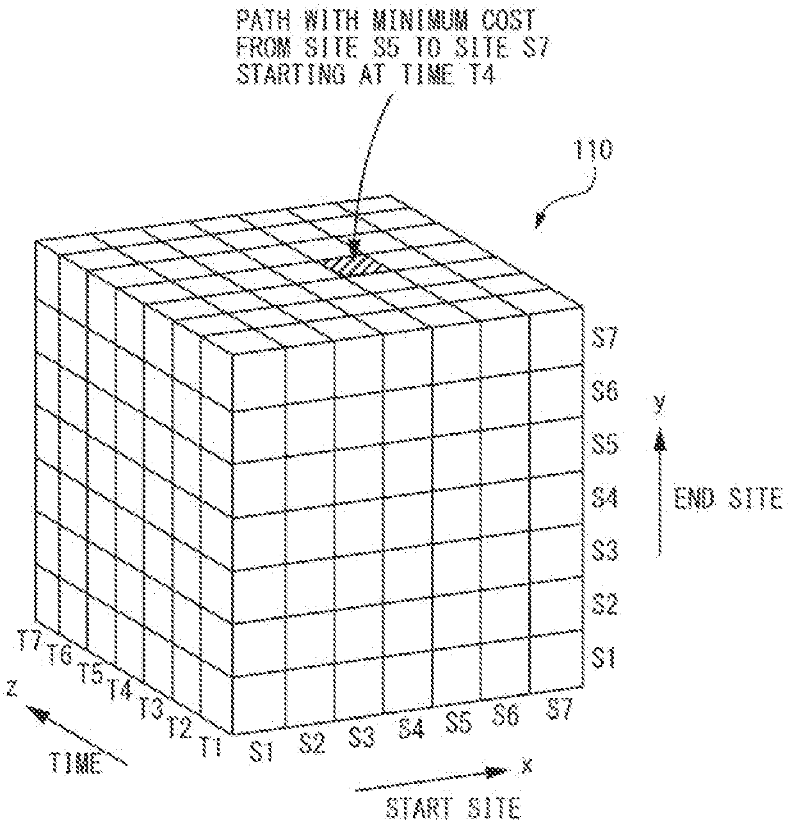
FIG. 8 illustrates the time-dependent path matrix.

FIG. 8 illustrates the time-dependent path matrix 110. Note that, hereinafter, the terms "time-dependent path matrix 110" and "path matrix 110" are used interchangeably. The path matrix 110 may be a three-dimensional matrix; the first index (x-coordinate) of a cell represents the start site of travel, the second index (y-coordinate) of a cell represents the end site of travel, and the third index (z-coordinate) of a cell represents a point of time, respectively.

The cell (Si, Sj, Tk) of the time-dependent path matrix 110 may indicate the path with minimum cost of travel from the site Si to the site Sj with the start time of travel being Tk. For example, the coordinate of the cell filled with diagonal lines shown by FIG. 8 is (S5, S7,T4). Thus, the value indicated by this cell indicates the path with minimum cost of travel from the site S5 to S7 with the start time of travel T4.

When initializing the path matrix 110, it can be assumed that the cost of each path is constant over time. Thus, for each pair of the start and end sites, the generation unit 2040 determines a path with minimum cost out of possible paths for that pair by solving a shortest path problem using a map information in which the cost of each path is constant. The map information may store a grid map of the workspace. In the case where the target vehicle 40 moves two-dimensionally in the workspace (e.g., the target vehicle 30 is a car), the grid information shows a two-dimensional grid map of the floor of the workspace. In the case where the target vehicle 30 moves three-dimensionally in the workspace (e.g., the target vehicle 30 is a drone), the grid information shows a three-dimensional grid map of the workspace. The grid map also shows a location of each site and permanent obstacles, such as walls, shelves, desks, and so on.

Figure 9:
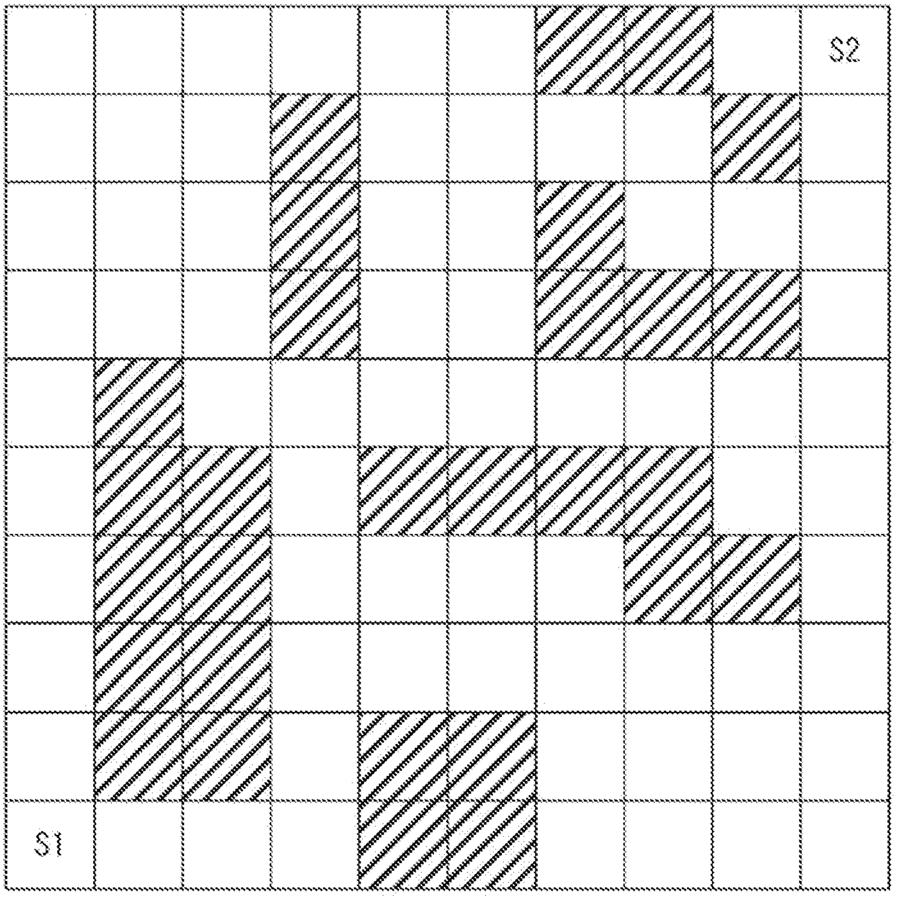
FIG. 9 illustrates a part of the grid map shown by the map information.

FIG. 9 illustrates a part of the grid map shown by the map information. The grid map of FIG. 9 shows the locations of the sites S1 and S2. In addition, the locations of the permanent obstacles are indicated with diagonal lines. Each path from the sites S1 to S2 can be represented by a sequence of locations (grids) through which the target vehicle 30 can travel.

Since the cost of each path is assumed to be constant over time, the shortest path for each pair of sites can be found by using an arbitrary algorithm for solving the shortest path problem, such as Dijkstra's algorithm, A* search algorithm, or space time A* algorithm. Note that, as mentioned in depth later, in the case where the cost varies over time, the shortest path problem is solved using an algorithm that can handle time-dependent costs, such as space time A* algorithm.

After the time-dependent path matrix 110 is initialized, the generation unit 2040 initializes the time-dependent cost matrix 100 based on the time-dependent path matrix 110. Specifically, each cell of the time-dependent cost matrix 100 should indicate the cost of the path indicated by the corresponding cell of the time-dependent path matrix. Thus, the generation unit 2040 sets the cost indicated by the cell (Si, Sj, Tk) of the time-dependent path matrix 100 to the cell (Si, Sj, Tk) of the time-dependent cost matrix 100, for each pair of i, j, and k.

<Generation of Schedule Information: S106 to S110>

The generation unit 2040 determines the execution order of the tasks (S106), selects the task path for each task (S108), thereby generating the schedule information 20 (S110). FIG. 10 illustrates the schedule information 20 in a table format. The schedule information 20 includes four types of data for each task: a task identifier 22, a task site 24, and a task path 26, and a start time 28.

The task identifier 22 indicates an identifier of the task. The target site 24 indicates the site at which the target vehicle 30 executes that task. The task path 26 indicates the task path through which the target vehicle 30 travels to the task site. The start time 28 indicates the time from which the task starts traveling to the task site. In the schedule information 20, it is preferable that tasks are sorted in ascending order of the start time so as to make it easier to know the execution order of the tasks.

The generation unit 2040 determines the execution order of the tasks assigned to the target vehicle 30 by solving a TDVRP with the time-dependent cost matrix 100. To solve a TDVRP, it is required to give a departure site, a destination site, a list of tasks to be executed, a capacity of the target vehicle 30, and a time-dependent cost function to an algorithm for solving a TDVRP. The departure site is an initial location of the target vehicle 30. The destination site is a location to which the target vehicle 30 travels when all tasks are finished. For example, a storage of vehicles in the workspace may be set as the departure site and the destination site.

The generation unit 2040 uses the task list information 10 as the list of tasks to be executed. In addition, the generation unit 2040 uses the time-dependent cost matrix 100 as the time-dependent cost function. Regarding the departure site, the destination site, and the capacity of the target vehicle 30, they may be defined in association with the target vehicle 30 in advance. Thus, the generation unit 2040 may acquire information (hereinafter, called vehicle information), that indicates the departure site, the destination site, and the capacity of the target vehicle 30 from, for example, a storage unit in which that information is stored in advance.

As a solution of the TDVRP, the generation unit 2040 obtains the execution order of the tasks to be executed by the target vehicle 30. Note that there are various algorithms for solving a TDVRP. One of the examples is Mixed Integer Linear Programming (MILP). In another example, meta-heuristic algorithms such as Tabu search algorithm or Iterated local search algorithm can also be employed. The generation unit 2040 may use one of those algorithms.

After determining the execution order of the tasks, the generation unit 2040 selects the task path for each task. For example, the generation unit 2040 uses the time-dependent path matrix 110. Specifically, for each task, the generation unit 2040 extracts the path indicated by the cell corresponding to the start site, task site, and start time of the task from the time-dependent path matrix 110, and set the extracted path as the task path of the task. Note that the start site of the task is the task site of the previous task.

Suppose that the (n−1)-th task includes traveling to the site Sn−1 at time Tn−1 and picking up a load, and the n-th task includes traveling to the site Sn at time Tn and unload the load. In this case, the path indicated by the cell (Sn−1, Sn, Tn) of the path matrix 110 is used as the task path of the n-th task.

Regarding the start time of the task, it can be computed as a sum of the travel time and the required time (e.g., time required to pick up a load) from the first task to the previous task. The travel time of the task may be computed using the cost of the task path and the speed of the target vehicle 30. The computation of the start time of the task may be formulated as follows:

Equation 1

$$STn = \sum_{a=1}^{n-1} f(Ca, v) + Ra) \quad (1)$$

where STn is the start time of the n-th task; Ca is the cost of the task path of the a-th task; v is the speed of the target vehicle 30; f( ) is a function to compute the travel time for traveling the path based on the cost of the path and the speed of the target vehicle 30; and Ra is the required time of the a-th task.

After selecting the task path for each task, the generation unit 2040 generates the schedule information 20 that shows the execution order of the tasks and the task path for each path that are determined as described above.

<Conflict Detection: S112>

The conflict detection unit 2060 performs the conflict detection for the target vehicle 30 (S112). There may be two types of situations that can be handled as conflict. The first type of conflict is called a vertex conflict where the target vehicle 30 and a temporary obstacle are scheduled to occupy the same location at the same point of time as each other.

The temporary obstacle is a type of obstacle that occupies a certain area of the workspace temporarily, not permanently. For example, the temporary obstacle may be a vehicle that is assigned to a target person other than that of the target vehicle 30 and whose schedule information 20 was already generated. In another example, the temporary obstacle may be a person who is scheduled to occupy a certain area of the workspace to do something, such as operating an equipment.

Suppose that the target vehicle V1 is scheduled to perform a task at site S1 during time T2 to T4. In addition, another vehicle V2 is scheduled to perform a task at site S1 during time T1 to T3 (T1<T2<T3<T4). In this case, the vehicles V1 and V2 has a vertex conflict during time T2 to T3 since they occupy the same location S1 during time T2 to T3.

The second type of conflict is called an edge conflict where two vehicles are scheduled to cross each other. Suppose that the target vehicle V1 moves from a location A to B during time T1 to T2. At the same time, another vehicle V2 moves from the location B to A during time T1 to T2. In this case, the vehicles V1 and V2 do not occupy the same location at the same point of time, but still they have conflict while crossing each other (also known as crossover conflict).

For each temporary obstacle, the conflict detection unit 2060 obtains event information that indicates a schedule of events by which a certain area of the workspace is occupied. Specifically, the event information may indicate the location of a temporary obstacle for each point of time. Pieces of the event information are, for example, stored in advance in a storage unit to which the vehicle scheduling apparatus 2000 has access. Note that, in the case where the temporary obstacle is a vehicle, the conflict detection unit 2060 uses the schedule information 20 of that temporary obstacle as the event information.

For each temporary obstacle, the conflict detection unit 2060 compares the location of the target vehicle and that of the temporary obstacle for each point of time using the schedule information 20 of the target vehicle 30 and the event information of the temporary obstacle, thereby determining whether or not the target vehicle 30 and the temporary obstacle conflicts with each other (in other words, whether or not they are scheduled to be located at the same location at the same time). If it is determined that the target vehicle 30 and the temporary obstacle conflicts with each other, the conflict detection unit 2060 adds information about the detected conflict into the conflict information. The conflict information indicates a location and a period of time of the conflict. Note that the conflict information is initialized to be empty before starting the conflict detection.

<Update of Cost Matrix 100: S114>

In the case where one or more conflicts are detected for the target vehicle 30 (S112: YES), the update unit 2080 updates the time-dependent cost matrix 110 based on the conflict information. The update unit 2080 may use the time-dependent path matrix 110 to update the time-dependent cost matrix 100. In this case, the update unit 2080 may first update the time-dependent path matrix 110 by solving the shortest path problem with an algorithm that can handle time-dependent costs, such as space time A* algorithm.

The space time A* algorithm handles a data structure called a reservation table, which is a time-dependent grid map that shows the location of each obstacle for each point of time. The permanent obstacle shown by the map information is handled in the reservation table as an obstacle that occupies one or more grids for every point of time. On the other hand, the conflict shown by the conflict information is handled in the reservation table as an obstacle that occupies one or more grids only during the occurrence of the conflict at the location.

The update unit 2080 generates a reservation table using the map information and the conflict information. Specifically, for each permanent obstacle shown by the map information, the update unit 2080 puts it into the location in the reservation table that corresponds to the location of the permanent obstacle in the map information for every point of time. In addition, for each conflict shown by the conflict information, the update unit 2080 puts it as an obstacle into the location in the reservation table that corresponds to the location of the conflict in the conflict information during the period of time shown by the conflict information.

Figure 11:
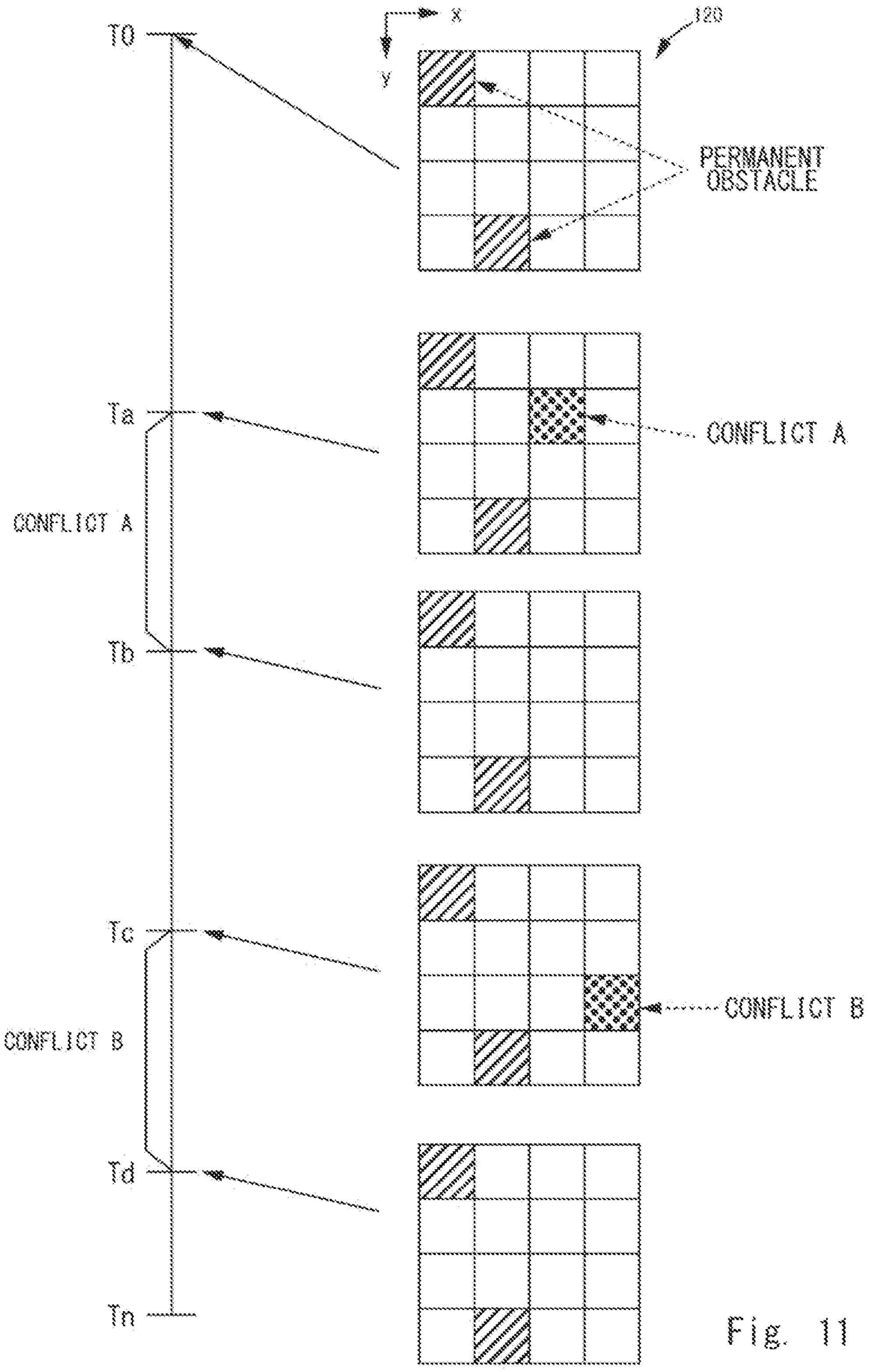
FIG. 11 illustrates an example of the reservation table.

FIG. 11 illustrates an example of the reservation table. In this example, the reservation table shows a time-dependent grid map 120 from time T0 to Tn. The map information shows a permanent obstacle at the locations (1,1) and (2,4). The conflict information shows a conflict A that occurs at the location (3,2) from time Ta to Tb and a conflict B that occurs at the location (4,3) from time Tc to Td (T0<Ta<Tb<Tc<Td<Tn).

In this case, the reservation table shows the permanent obstacles at the location (1,1) and (2,4) from time T0 to Ta. From time Ta to Tb, the reservation table further shows the conflict A at the location (3,2). From time Tb to Tc, the reservation table only shows two permanent obstacles again. Then, from time Tc to Td, the reservation table further shows the conflict B at the location (4,3). After time Td, the reservation table only shows two permanent obstacles again.

The reservation table is generated for each pair of sites. Then, the update unit 2080 solves the shortest path problem using the reservation table for each pair of sites. As a result, the update unit 2080 figures out the path with minimum cost for each pair of sites and for each point of time, thereby updating the time-dependent path matrix 110. Note that there is no need to update the path of the pair of sites in the case where no conflict is detected on the path of that pair.

After updating the time-dependent path matrix 110, the update unit 2080 updates the time-dependent cost matrix 110 based on the updated path matrix 110. Note that the update of the time-dependent cost matrix 100 based on the time-dependent path matrix 110 can be performed in the same manner as the initialization of the time-dependent cost matrix 100 based on the time-dependent path matrix 110 mentioned above.

<Output of Schedule Information 20: S116>

In the case where no conflict is detected by the conflict detection unit 2060 (S112: NO), the vehicle scheduling apparatus 2000 outputs the schedule information 20. The schedule information 20 can be output in a various manner. For example, the vehicle scheduling apparatus 2000 may put the schedule information 20 into a storage unit. In another example, the vehicle scheduling apparatus 2000 may output the schedule information 20 to a display device so as to cause the display device to display the schedule information 20. In another example, the vehicle scheduling apparatus 2000 may send the schedule information 20 another computer, such as a mobile device or a PC operated by the target person. Note that it is preferable that the schedule information 20 is output in association with the identifier of the target vehicle 30.

<Handling Multiple Target Vehicles 30>

It is possible that the target person is assigned two or more target vehicles 30. This case is different from the case where the target person is assigned a single target vehicle 30 in that the target vehicles 30 could conflict with each other. How to handle multiple target vehicles 30 is described below.

Figure 12:
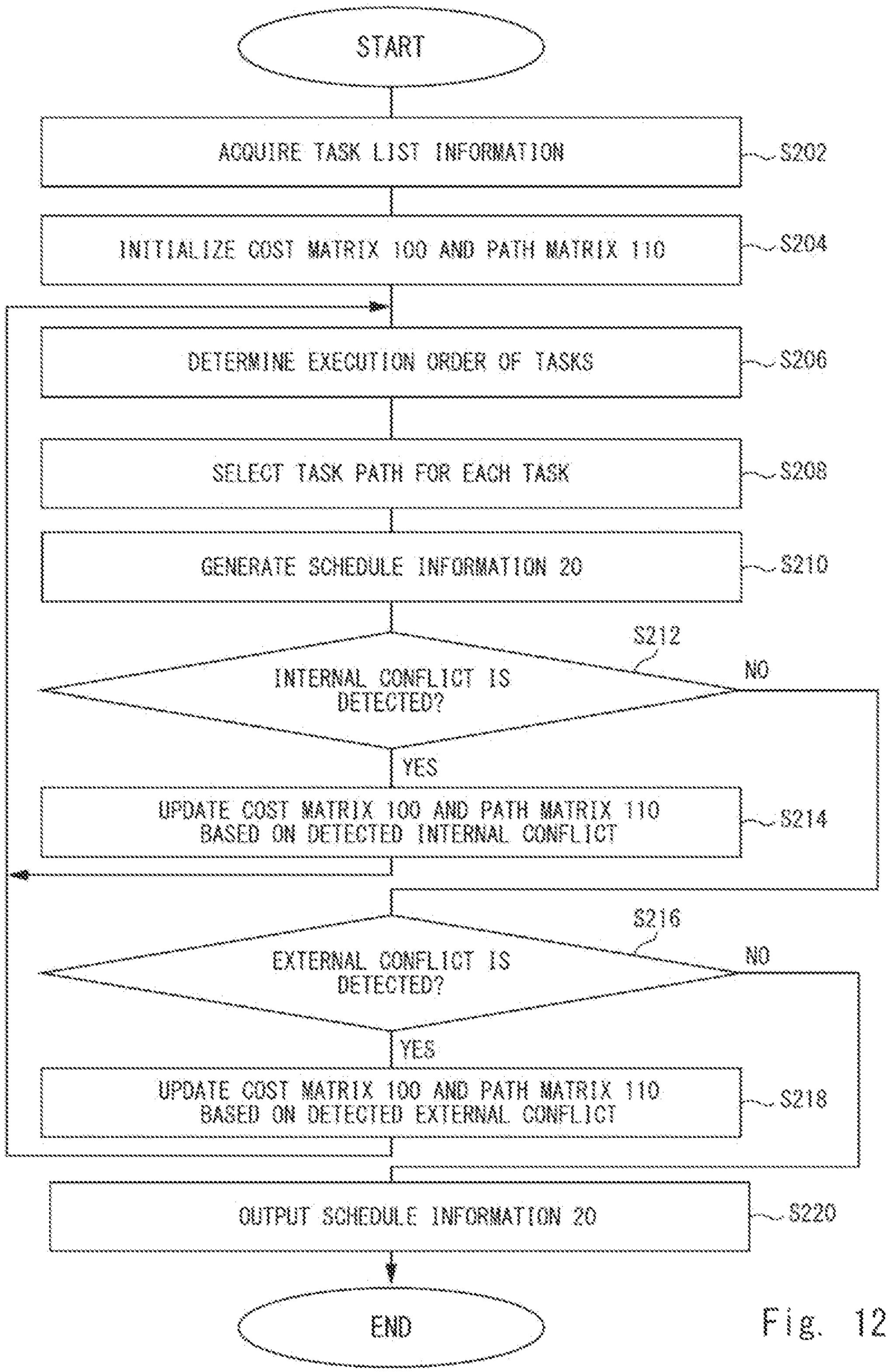
FIG. 12 is a flowchart illustrating an example of a process performed by the vehicle scheduling apparatus of the first example embodiment in the case where the multiple target vehicles are assigned to the target person.

FIG. 12 is a flowchart illustrating an example of a process performed by the vehicle scheduling apparatus 2000 in the case where the multiple target vehicles 30 are assigned to the target person. The acquisition unit 2020 acquires the task list information 10 (S202). Then, the generation unit 2040 initializes the time-dependent cost matrix 100 and the time-dependent path matrix (S204). These processes are performed in the same manner as the case where the target person is assigned a single target vehicle 30.

The generation unit 2040 determines the execution order of tasks for each target vehicle 30 (S206). In order to determine the execution order of tasks for each target vehicle 30, it is required to determine an assignment of tasks to each target vehicle 30. Regarding this point, the assignment of tasks to each target vehicle 30 and the determination of the execution order of tasks for each target vehicle 30 can be simultaneously performed by solving a TDVRP. Specifically, an algorithm solving a TDVRP further takes the number of vehicles and the capacity of each vehicle as an input, and outputs the execution order of tasks for each vehicle. Thus, as a result of solving a TDVRP, the generation unit 2040 can obtain the execution order of the tasks for each target vehicle 30. Note that the number of target vehicle 30 and the capacity of each vehicle may be included in the vehicle information that is mentioned above.

After determining the execution order of tasks for each target vehicle 30, the generation unit 2040 selects the task path for each task (S208). The selection of the task path is performed using the time-dependent path matrix 110 in the same manner as the case where the target person is assigned a single target vehicle 30. As a result of the selection of the task path for each task, the generation unit 2040 generates the schedule information 20 for each target vehicle 30 (S210).

The detection unit 2060 performs the conflict detection. In the case where the target person is assigned multiple target vehicle 30, two types of conflict may occur: an internal conflict and an external conflict. The internal conflict is a conflict between the target vehicles 30. On the other hand, the external conflict is a conflict between the target vehicle 30 and a temporary obstacle, which is already explained above.

The detection unit 2060 may first perform the detection of the internal conflict (S212). For each pair of the target vehicles 30, the detection unit 2060 compares the schedule information 20 of them, and thereby detecting the internal conflict between them. Specifically, if two target vehicles 30 are scheduled to be located at the same location at the same time as each other, they conflict with each other.

In the case where the internal conflict is detected (S212: YES), the update unit 2080 updates the cost matrix 100 and the path matrix 110 based on the detected internal conflict (S214). In order to update the path matrix 110 based on the detected internal conflict, the update unit 2080 performs an internal conflict resolution, thereby computing a new path with minimum cost for a pair of sites for which the internal conflict is detected. The detection unit 2060 may use any internal conflict resolution algorithm, such as Conflict based search algorithm disclosed by NPL3.

As a result of the internal conflict resolution, a path with minimum cost is updated for the pair of sites for which the internal conflict is detected. Thus, the update unit 2080 updates the time-dependent path matrix 110 based on the result of the internal conflict resolution. The update unit 2080 also updates the time-dependent cost matrix 100 based on the updated path matrix 110. A way of updating the cost matrix 100 based on the updated path matrix 110 is the same as the way of initializing the cost matrix 100 based on the initialized path matrix 110.

In the case where no internal conflict is detected (S212: NO), the conflict detection unit 2060 performs the detection of the external conflict (S216). A way of detecting the external conflict (i.e., a conflict between the target vehicle 30 and a temporary obstacle) is already described above. Note that since there are multiple target vehicles 30, the detection of the external conflict is performed for each target vehicle 30.

In the case where no external conflict is detected (S216: NO), the vehicle scheduling apparatus 2000 outputs the schedule information 20 (S220) since no conflict is detected in this case. On the other hand, in the case where the external conflict is detected (S216: YES), the update unit 2080 updates the time-dependent cost matrix 100 and the time-dependent path matrix 110 based on the detected external conflict (S218). This process can be performed in the same manner as the case where the target person is assigned a single target vehicle 30.

After the time-dependent cost matrix 100 and the time-dependent path matrix 110 are updated (S214 or S218), the apparatus 2000 determines the execution order of tasks, selects the task path for each task, and generates the schedule information 20 again (S206, S208, and S210). Then, the detections of the internal conflicts and the external conflict are performed again (S212 and S216). Those repetitive executions of processes continue until no conflict is detected (S216: NO).

<Modification of Schedule Information of Other Vehicle>

The explanations above, it is the schedule information 20 of the target vehicle 30 that is updated to avoid conflicts. However, in the case where the target vehicle 30 conflicts with a vehicle other than the target vehicles 30 (called an obstacle vehicle, hereinafter), the conflict can be avoided by updating the schedule information 20 of the obstacle vehicle instead of that of the target vehicle 30.

Suppose that it is detected that the target vehicle 30 conflicts with a vehicle V1 whose schedule information 20 was fixed and stored in a storage unit. In this case, it is possible to avoid the conflict by updating the schedule information 20 of the vehicle V1 while fixing the schedule information 20 of the target vehicle 30.

When the external conflict is detected between the target vehicle 30 and an obstacle vehicle, the update unit 2080 may check whether or not it is accepted to update the schedule information 20 of the obstacle vehicle. If it is accepted, the schedule information 20 of the obstacle vehicle is repeatedly updated until no conflict is detected in the same manner as the repetitive update of the schedule information 20 of the target vehicle 30 mentioned above. In this case, the vehicle scheduling apparatus 2000 outputs the schedule information 20 of the target vehicle 30 without updating it based on the conflict. In addition, the vehicle scheduling apparatus 2000 further outputs the schedule information 20 of the obstacle vehicle after updating it until no conflict is detected. In the case where it is not accepted to update the schedule information 20 of the obstacle vehicle, the vehicle scheduling apparatus 2000 repeatedly generates the schedule information 20 of the target vehicle 30 until no conflict is detected.

There are various ways for the vehicle scheduling apparatus 2000 to check the acceptance of the update of the schedule information 20 of the obstacle vehicle. For example, the vehicle scheduling apparatus 2000 sends a request for the acceptance of the update of the schedule information 20 to an address that is associated with the obstacle vehicle in advance, e.g., an e-mail address of an operator of the obstacle vehicle. In this case, the vehicle scheduling apparatus 2000 receives from a response to the request, and checks whether or not the response indicates the update of the schedule information 20 of the obstacle vehicle is acceptable. In the case where the response indicates that the update of the schedule information 20 of the obstacle vehicle is acceptable, the vehicle scheduling apparatus 2000 performs the repetitive updates of the schedule information 20 of the obstacle vehicle.

In another example, the schedule information 20 may have an acceptance flag that indicates whether or not the update thereof is acceptable. In this case, the vehicle scheduling apparatus 2000 checks whether or not the acceptance flag in the schedule information 20 of the obstacle vehicle indicates that the update thereof is acceptable. In the case where the acceptance flag in the schedule information 20 of the obstacle vehicle indicates that the update thereof is acceptable, the vehicle scheduling apparatus 2000 performs the repetitive updates of the schedule information 20 of the obstacle vehicle. The value of the acceptance flag may be set by an operator of the obstacle vehicle in advance.

Second Example Embodiment

Overview

Figure 13:
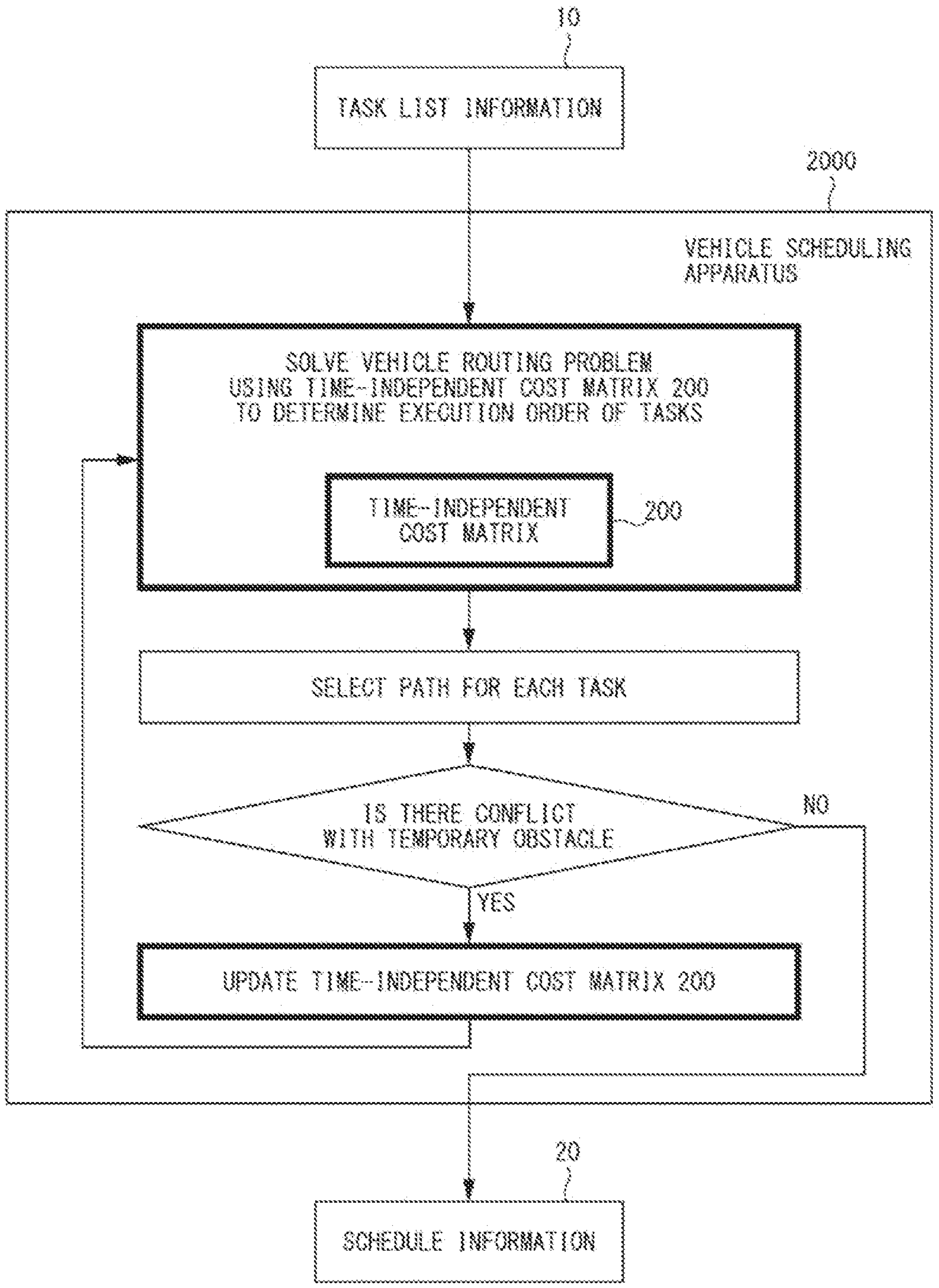
FIG. 13 illustrates an overview of the vehicle scheduling apparatus of the second example embodiment.

FIG. 13 illustrates an overview of the vehicle scheduling apparatus 2000 of the second example embodiment. Note that the overview illustrated by FIG. 13 shows an example of operations of the vehicle scheduling apparatus 2000 to make it easy to understand the vehicle scheduling apparatus 2000, and does not limit or narrow the scope of possible operations of the vehicle scheduling apparatus 2000.

The vehicle scheduling apparatus 2000 of the second example embodiment is different from that of the first example embodiment in that it assumes that a cost of travel for each pair of sites is constant over time. Thus, the vehicle scheduling apparatus 2000 of this example embodiment employs a time-independent cost matrix 200, instead of the time-dependent cost matrix 100, that shows a cost of travel for each pair of the sites that is constant regardless of when the target vehicle 30 start traveling.

Since costs are assumed to be constant over time, the execution order of tasks assigned to the target vehicle 30 can be determined by solving arbitrary VRP that handles time-independent costs. For example, a capacitated VRP (CVRP) is employed when taking the capacity of vehicles into consideration. In this case, the execution order of tasks assigned to the target vehicle 30 is obtained as a solution of the CVRP.

When the conflict is detected, the vehicle scheduling apparatus 2000 updates the time-independent cost matrix 200 based on the conflict. Since the time-independent cost matrix 200 does not handle time-based costs, the time-independent cost matrix 200 handles the temporary obstacle in the same manner as the permanent obstacle. Specifically, a location where the conflict is detected is considered to be occupied by the obstacle regardless of when the conflict occurs.

Example of Advantageous Effect

In a similar manner to the vehicle scheduling apparatus 2000 of the first embodiment, the vehicle scheduling apparatus 2000 of the second example embodiment repeatedly updates the execution schedule of the tasks of the target vehicle 30 until the target vehicle 30 does not conflict any temporary obstacle. Therefore, the vehicle scheduling apparatus 2000 of the second embodiment can efficiently generate the execution schedule of the tasks of each vehicle for the same reason as the vehicle scheduling apparatus 2000 of the first example embodiment. In addition, the vehicle scheduling apparatus 2000 of the second example embodiment is likely to take less time than that of the first example embodiment to fix the schedule information 20 since solving a VRP with time-independent costs is likely to take less time than solving a TDVRP.

Hereinafter, more detailed explanation of the vehicle scheduling apparatus 2000 will be described.

<Example of Functional Configuration>

The vehicle scheduling apparatus 2000 of the second example embodiment may have a functional configuration similar to that of the vehicle scheduling apparatus 2000 of the first example embodiment. Thus, an example of a functional configuration of the vehicle scheduling apparatus 2000 may also be depicted by FIG. 3.

The generation unit 2040 of the second example embodiment is different from that of the first example embodiment in that it solves a VRP with time-independent costs, not a TDVRP, to determine the execution order of tasks. In addition, it uses the time-independent cost matrix 200, not the time-dependent cost matrix 100. The update unit 2080 of the second example embodiment is different from that of the first example embodiment in that it updates the time-independent cost matrix 200, not the time-dependent cost matrix 100, based on the detected conflict.

<Example of Hardware Configuration>

The vehicle scheduling apparatus 2000 of the second example embodiment may be realized by one or more computers similar to those realizing the vehicle scheduling apparatus 2000 of the first example embodiment. Thus, its hardware configuration may also be depicted by FIG. 4.

<Flow of Process>

Figure 14:
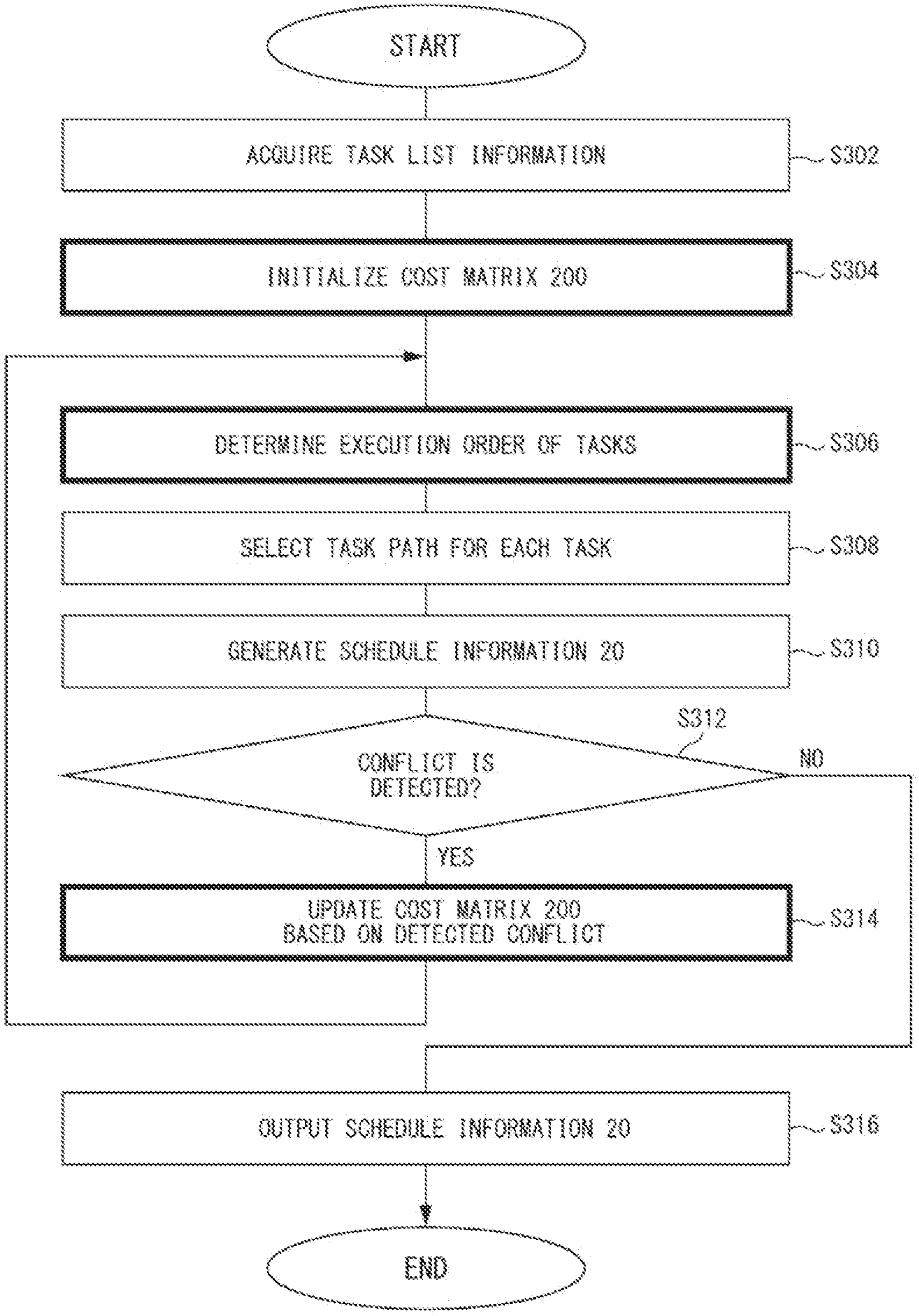
FIG. 14 is a flowchart illustrating an example of a process performed by the vehicle scheduling apparatus 2000 of the second example embodiment.

FIG. 14 is a flowchart illustrating an example of a process performed by the vehicle scheduling apparatus 2000 of the second example embodiment. In FIG. 14, processes with thicker boundary (Step S304, S306, S308, and S314) have difference from the counterparts in the first example embodiment shown by FIG. 5.

The acquisition unit 2020 acquires the task list information 10 (S302). The generation unit 2040 initializes the time-independent cost matrix 200 (S304). The generation unit 2040 determines the execution order of tasks using the time-independent cost matrix 200 (S306). The generation unit 2040 selects the task path for each task (S308). The generation unit 2040 generates the schedule information 20 (S310). The conflict detection unit 2060 performs the conflict detection using the schedule information 20 (S312). In the case where the conflict is not detected (S312: NO), the vehicle scheduling apparatus 2000 outputs the schedule information 20 (S316). On the other hand, in the case where the conflict is detected (S312: YES), the update unit 2080 updates the time-independent cost matrix 200 based on the detected conflict (S314).

After the update of the time-independent cost matrix 200, the process of the vehicle scheduling apparatus 2000 goes back to Step S306. By doing so, the generation of the schedule information 20 (S306 to S310), the conflict detection (S312), and the update of the time-independent cost matrix 200 (S314) are repeatedly performed until no conflict is detected at Step S312.

<Acquisition of Task List Information: S302>

The acquisition unit 2020 acquires the task list information 10 in the same manner as that of the first example embodiment.

<Initialization of Time-Independent Cost Matrix 200: S304>

Figure 15:
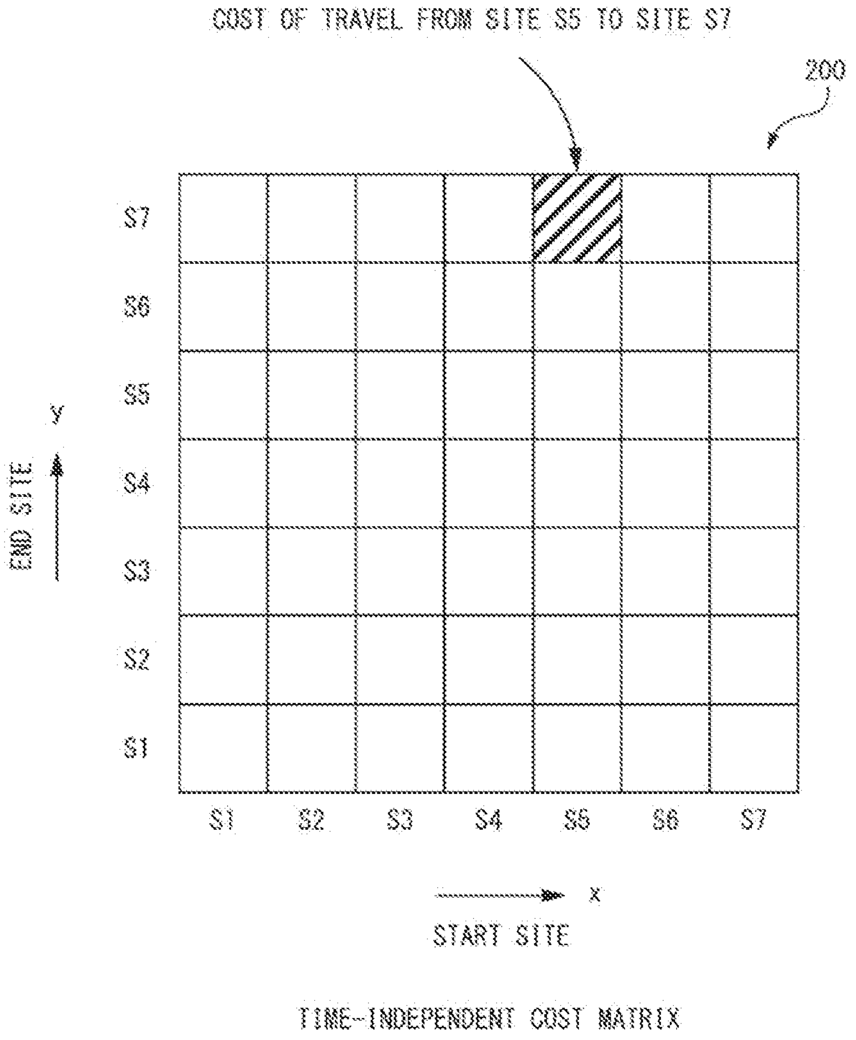
FIG. 15 illustrates the time-independent cost matrix.

The generation unit 2040 initializes the time-independent cost matrix 200 (S304). The time-independent cost matrix 200 shows a minimum cost of travel for each pair of sites, each of which is constant over time. FIG. 15 illustrates the time-independent cost matrix 200. The time-independent cost matrix 200 may be a two-dimensional matrix; the first index (x-coordinate) of a cell represents the start site of travel, and the second index (y-coordinate) of a cell represents the end site of travel, respectively.

The cell (Si, Sj) of the cost matrix 200 may indicate the minimum cost of travel from the site Si to the site Sj. For example, the coordinate of the cell filled with diagonal lines shown by FIG. 15 is (S5, S7). Thus, the value indicated by this cell indicates the minimum cost of travel from the site S5 to S7.

In order to initialize the time-independent cost matrix 200, the generation unit 2040 of the second example embodiment may use a time-independent path matrix in a similar manner that the generation unit 2040 of the first example embodiment uses the time-dependent path matrix 110. The time-independent path matrix shows a path with minimum cost for each pair of sites that is constant over time.

Figure 16:
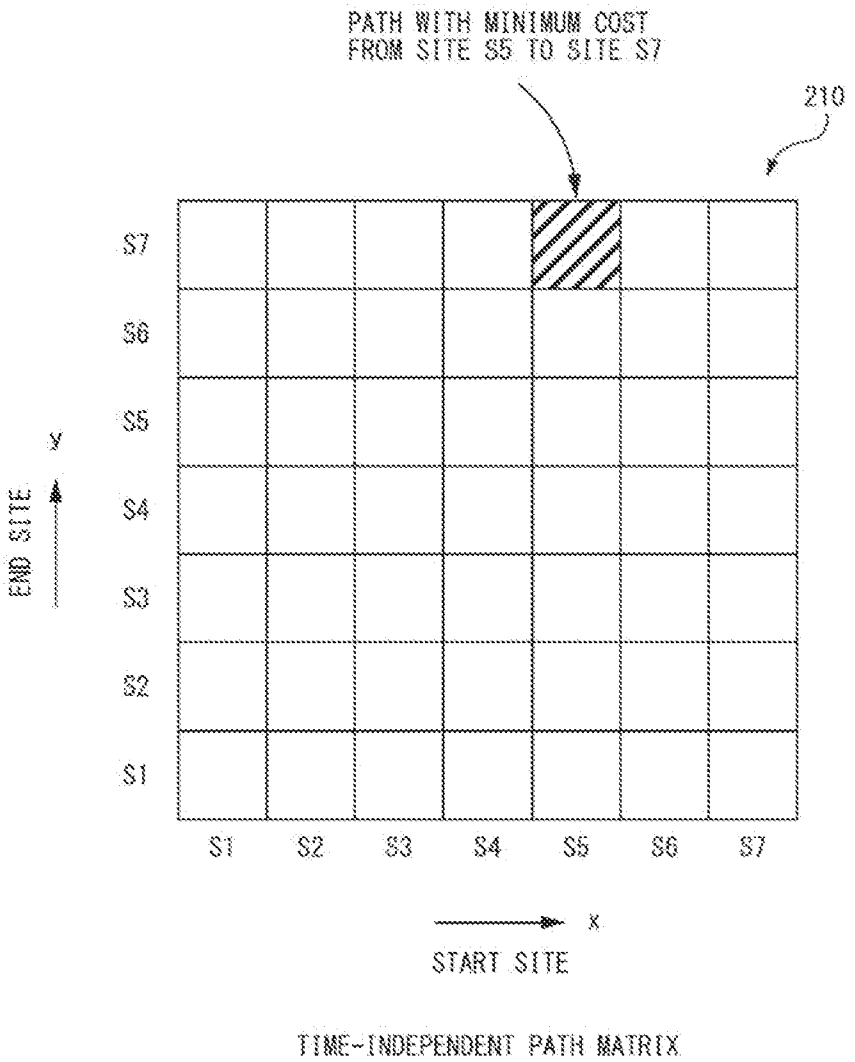
FIG. 16 illustrates the time-independent path matrix.

FIG. 16 illustrates the time-independent path matrix 210. Note that, hereinafter, the terms "time-independent path matrix 210" and "path matrix 210" are used interchangeably. The path matrix 210 may be a two-dimensional matrix; the first index (x-coordinate) of a cell represents the start site of travel, and the second index (y-coordinate) of a cell represents the end site of travel, respectively.

The cell (Si, Sj) of the time-independent path matrix 210 may indicate the path with minimum cost of travel from the site Si to the site Sj. For example, the coordinate of the cell filled with diagonal lines shown by FIG. 16 is (S5,S7). Thus, the value indicated by this cell indicates the path with minimum cost of travel from the site S5 to S7.

For each pair of the start and end sites, the generation unit 2040 determines a path with minimum cost out of possible paths for that pair by solving a shortest path problem using the map information that has been explained above. Since the cost of each path is assumed to be constant over time, the shortest path for each pair of sites can be found by using an arbitrary algorithm for solving the shortest path problem, such as Dijkstra's algorithm, A* search algorithm, or space time A* algorithm.

After the time-independent path matrix 210 is initialized, the generation unit 2040 initializes the time-independent cost matrix 200 based on the time-independent path matrix 210 in a similar manner of initializing the time-dependent cost matrix 100 based on the time-dependent path matrix 110. Specifically, each cell of the time-independent cost matrix 200 should indicate the cost of the path indicated by the corresponding cell of the time-independent path matrix 210. Thus, the generation unit 2040 sets the cost indicated by the cell (Si,Sj) of the time-independent path matrix 210 to the cell (Si,Sj) of the time-independent cost matrix 200, for each pair of i and j.

<Generation of Schedule Information: S306 to S310>

The generation unit 2040 determines the execution order of the tasks (S306), selects the task path for each task (S308), thereby generating the schedule information 20 (S310). The generation unit 2040 determines the execution order of the tasks assigned to the target vehicle 30 by solving a VRP with the time-independent cost matrix 200. To solve a VRP with time-independent costs, it is required to give a departure site, a destination site, a list of tasks to be executed, and a time-independent cost function to an algorithm for solving a VRP. Note that when the CVRP is employed, the capacity of the target vehicle 30 is also given to the algorithm. The explanations about the departure site, the destination site, and the list of tasks to be executed are already described in the first example embodiment. As the time-independent cost function, the generation unit 2040 uses the time-independent cost matrix 200.

As a solution of the VRP, the generation unit 2040 obtains the execution order of the tasks to be executed by the target vehicle 30. Note that there are various algorithms for solving a VRP. For example, MILP or metaheuristic algorithms such as Tabu search algorithm or Iterated local search algorithm can be employed to solve a VRP.

After determining the execution order of the tasks, the generation unit 2040 selects the task path for each task. In this example embodiment, the generation unit 2040 may use the time-independent path matrix 210. Specifically, for each task, the generation unit 2040 extracts the path indicated by the cell corresponding to the start site and task site of the task from the time-independent path matrix 210, and set the extracted path as the task path of the task.

Suppose that the (n−1)-th task includes traveling to the site Sn−1 and picking up a load, and the n-th task includes traveling to the site Sn and unload the load. In this case, the path indicated by the cell (Sn−1, Sn) of the path matrix 210 is used as the task path of the n-th task.

After selecting the task path for each task, the generation unit 2040 of the second example embodiment generates the schedule information 20 in the same manner as that of the first example embodiment.

<Conflict Detection: S312>

The conflict detection unit 2060 performs the conflict detection for the target vehicle 30 (S312). The conflict detection unit 2060 of the second example embodiment detects conflicts in the same manner as that of the first example embodiment.

<Update of Cost Matrix 200: S314>

In the case where one or more conflicts are detected for the target vehicle 30 (S312: YES), the update unit 2080 updates the time-independent cost matrix 200 based on the conflict information. The update unit 2080 may use the time-independent path matrix 210 to update the time-independent cost matrix 200. In this case, the update unit 2080 may first update the time-independent path matrix 210 by solving the shortest path problem with arbitrary algorithm.

In order to reflect the detected conflict on the solution of the shortest path problem, the update unit 2080 generates a time-independent grid map based on the map information and the conflict information, and input it to the algorithm for solving the shortest path problem. This time-independent grid map is the same as the grid map shown by the map information except that it has an obstacle at a grid that corresponds to a location where the conflict is detected.

Figure 17:
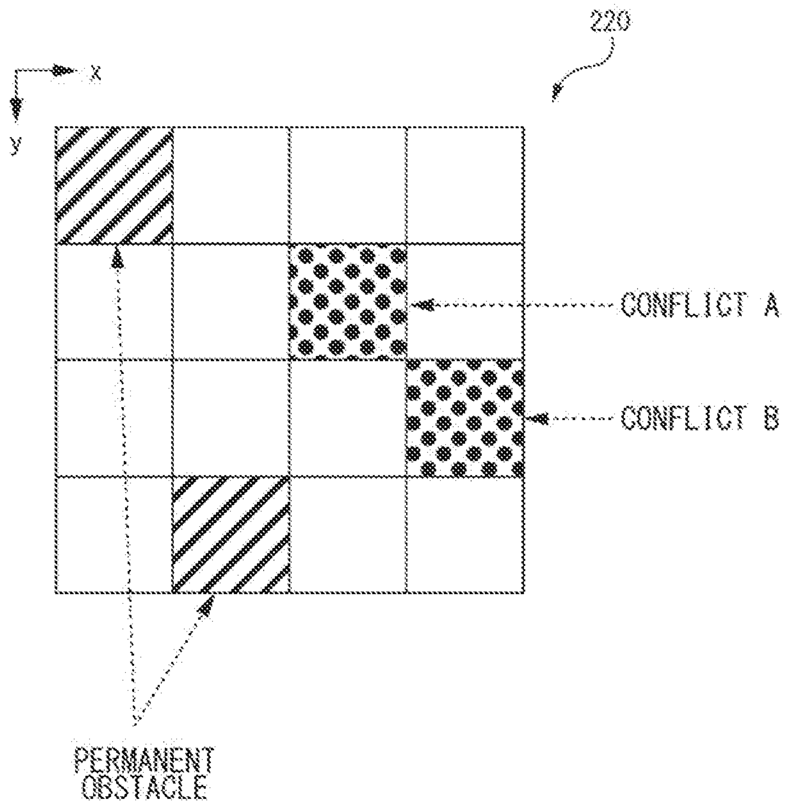
FIG. 17 illustrates a time-independent grid map.

FIG. 17 illustrates a time-independent grid map 220. In this example, it is assumed that the map information shows a permanent obstacle at the locations (1,1) and (2,4). In addition, the conflict information shows a conflict A that occurs at the location (3,2) from time Ta to Tb and a conflict B that occurs at the location (4,3) from time Tc to Td (T0<Ta<Tb<Tc<Td<Tn).

In this case, the time-independent grid map 220 shows obstacles at the location (1,1) and (2,4) that are shown by the map information. In addition, it also shows an obstacle at (3,2) that corresponds to the conflict A, and an obstacle at (4,3) that corresponds to the conflict B.

The time-independent grid map 220 is generated for each pair of sites. Then, the update unit 2080 solves the shortest path problem using the time-independent grid map 220 for each pair of sites. As a result, the update unit 2080 figures out the path with minimum cost for each pair of sites, thereby updating the time-independent path matrix 210.

After updating the time-independent path matrix 210, the update unit 2080 updates the time-independent cost matrix 200 based on the updated path matrix 210. Note that the update of the time-independent cost matrix 200 based on the time-independent path matrix 210 can be performed in the same manner as the initialization of the time-independent cost matrix 200 based on the time-independent path matrix 210 mentioned above.

<Output of Schedule Information 20: S316>

In the case where no conflict is detected by the conflict detection unit 2060 (S312: NO), the vehicle scheduling apparatus 2000 outputs the schedule information 20 (S316). The schedule information 20 of the second example embodiment is output in the same manner as that of the first example embodiment.

<Handling Multiple Target Vehicles 30>

Figure 18:
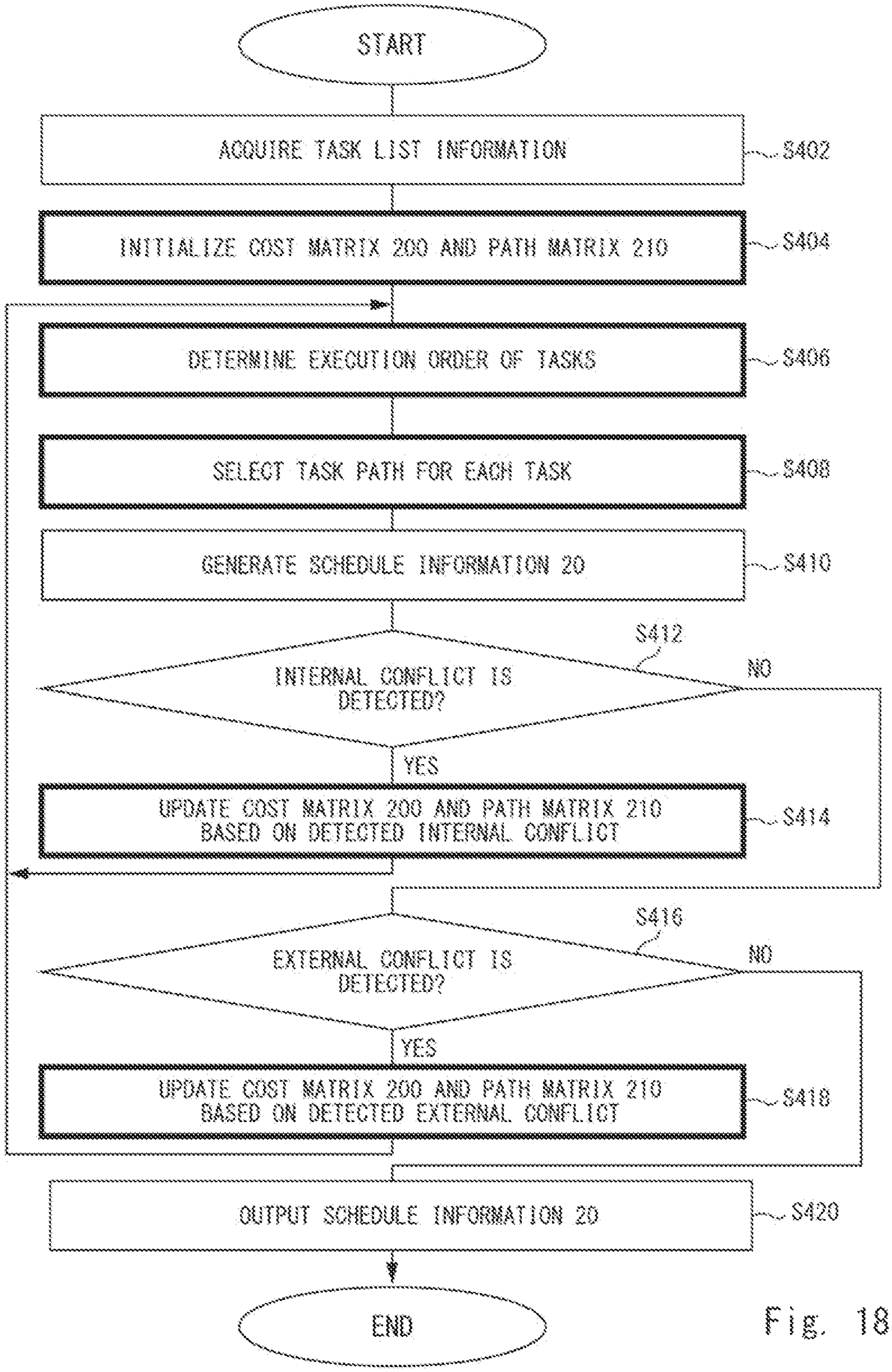
FIG. 18 is a flowchart illustrating an example of a process performed by the vehicle scheduling apparatus of the second example embodiment in the case where the multiple target vehicles assigned to the target person.

The vehicle scheduling apparatus 2000 of the second example embodiment handles multiple target vehicles 30 in the same manner as that of the first example embodiment except that the costs of travel between sites are assumed to be constant over time. FIG. 18 is a flowchart illustrating an example of a process performed by the vehicle scheduling apparatus 2000 of the second example embodiment in the case where the multiple target vehicles 30 are assigned to the target person. In FIG. 18, processes with thicker boundary (Step S404, S406, S408, S414, and S418) have difference from the counterparts in the first example embodiment shown by FIG. 12.

The acquisition unit 2020 acquires the task list information 10 (S402). Then, the generation unit 2040 initializes the time-independent cost matrix 200 and the time-independent path matrix 210 (S404). These processes are performed in the same manner as the case where the target person is assigned a single target vehicle 30.

The generation unit 2040 determines the execution order of tasks for each target vehicle 30 (S406). In a similar manner to the first example embodiment, the generation unit 2040 can perform the assignment of tasks to each target vehicle 30 and the determination of the execution order of tasks for each target vehicle 30 simultaneously by solving a VRP. Specifically, an algorithm solving a VRP further takes the number of vehicles as an input, and outputs the execution order of tasks for each vehicle. Thus, as a result of solving a VRP, the generation unit 2040 can obtain the execution order of the tasks for each target vehicle 30. Note that when the CVRP is employed, the capacity of each vehicle is also given to the algorithm that solves the CVRP.

After determining the execution order of tasks for each target vehicle 30, the generation unit 2040 selects the task path for each task (S408). The selection of the task path is performed using the time-independent path matrix 210 in the same manner as the case where the target person is assigned a single target vehicle 30. As a result of the selection of the task path for each task, the generation unit 2040 generates the schedule information 20 for each target vehicle 30 (S410).

Then, the detection unit 2060 may perform the detection of the internal conflict (S412). In the case where the internal conflict is detected (S412: YES), the update unit 2080 updates the cost matrix 200 and the path matrix 210 based on the detected internal conflict (S414). In the same manner as the first example embodiment, the update unit 2080 of the second example embodiment performs an internal conflict resolution, thereby computing a new path with minimum cost for a pair of sites for which the internal conflict is detected. The update unit 2080 updates the time-independent path matrix 210 based on the result of the internal conflict resolution. The update unit 2080 also updates the time-independent cost matrix 200 based on the updated path matrix 210.

In the case where no internal conflict is detected (S412: NO), the conflict detection unit 2060 performs the detection of the external conflict (S416) in the same manner as the first example embodiment.

In the case where no external conflict is detected (S416: NO), the vehicle scheduling apparatus 2000 outputs the schedule information 20 (S420) since no conflict is detected in this case. On the other hand, in the case where the external conflict is detected (S416: YES), the update unit 2080 updates the time-independent cost matrix 200 and the time-independent path matrix 210 based on the detected external conflict (S418). This process can be performed in the same manner as the case where the target person is assigned a single target vehicle 30.

After the time-independent cost matrix 200 and the time-independent path matrix 210 are updated (S414 or S418), the apparatus 2000 determines the execution order of tasks, selects the task path for each task, and generates the schedule information 20 again (S406, S408, and S410). Then, the detections of the internal conflicts and the external conflict are performed again (S412 and S416). Those repetitive executions of processes continue until no conflict is detected (S416: NO).

<Modification of Schedule Information of Other Vehicle>

In the same manner as the vehicle scheduling apparatus 2000 of the first example embodiment, the vehicle scheduling apparatus 2000 of the second example embodiment may repeatedly update the schedule information 20 of an obstacle vehicle that conflicts with the target vehicle when its update is acceptable.

Although the present disclosure is explained above with reference to example embodiments, the present disclosure is not limited to the above-described example embodiments. Various modifications that can be understood by those skilled in the art can be made to the configuration and details of the present disclosure within the scope of the invention.

The programs mentioned in this disclosure include instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

The whole or part of the example embodiments disclosed above can be described as, but not limited to, the following supplementary notes.

SUPPLEMENTARY NOTES

Supplementary Note 1

A vehicle scheduling apparatus comprising:

at least one processor; and memory storing instructions;

wherein the at least one processor is configured to execute the instructions to:

acquire a task list information that indicates tasks assigned to a target person to whom at least one target vehicle is assigned, the target vehicle executing each task assigned thereto at a task site corresponding to the task;

determine an execution order of the tasks for each target vehicle by solving a vehicle routing problem using a cost matrix that indicates a minimum cost for each pair of sites in a workspace;

select a task path for each task that is a path with minimum cost to travel to the task site of the task based on the determined execution order of the tasks;

generate, for each target vehicle, schedule information of the target vehicle that indicates the execution order of the tasks assigned to the target vehicle and the task path for each task;

detect an external conflict that is a conflict between the target vehicle and a temporary obstacle whose location varies over time; and in the case where one or more external conflicts are detected, further perform: updating the cost matrix so as to update the minimum cost of the pair of sites between whom the conflict is detected; and repeatedly performing the determination of the execution order of the tasks, the selection of the task path for each task, the generation of the schedule information, the detection of the conflict, and the update of the cost matrix until no detection between the target vehicle and the temporary obstacle is detected.

Supplementary Note 2

The vehicle scheduling apparatus according to supplementary note 1, wherein the detection of the external conflict includes:

acquiring event information for each temporary obstacle that indicates a location of the temporary obstacle for each point of time;

comparing the schedule information of the target vehicle and the event information for each temporary obstacle to determine that the target vehicle conflicts with the temporary obstacle in the case where the target vehicle and the temporary obstacle are scheduled to be located at a same location at a same time as each other.

Supplementary Note 3

The vehicle scheduling apparatus according to supplementary note 1 or 2, wherein the execution order of the tasks for each target vehicle is determined by solving a time-dependent vehicle routing problem, the cost matrix is configured to indicate time-dependent costs, and the initialization of the cost matrix includes:

initializing a path matrix by solving a shortest path problem using map information of the workspace, the path matrix indicates, for each pair of sites and for each point of time, a path with minimum cost of one or more possible paths between the sites, the map information indicating a location of each site and locations of permanent obstacles whose location does not vary overtime; and setting, for each pair of sites and each point of time, a cost of the path indicated by a cell of the path matrix to a corresponding cell of the cost matrix.

Supplementary Note 4

The vehicle scheduling apparatus according to supplementary note 3, wherein the update of the cost matrix includes:

generating a reservation table that indicates, for each point of time, a location of each site, locations of permanent obstacles, and locations of the external conflicts based on the map information and a result of the detection of the external conflict;

updating the path matrix by solving a shortest path problem using the reservation table; and setting, for each pair of sites and each point of time, a cost of the path indicated by a cell of the path matrix to a corresponding cell of the cost matrix.

Supplementary Note 5

The vehicle scheduling apparatus according to supplementary note 1 or 2, wherein the cost matrix is configured to indicate time-independent costs, and the initialization of the cost matrix includes:

initializing a path matrix by solving a shortest path problem using map information of the workspace, the path matrix indicates, for each pair of sites, a path with minimum cost of one or more possible paths between the sites, the map information indicating a location of each site and locations of permanent obstacles whose location does not vary overtime; and setting, for each pair of sites, a cost of the path indicated by a cell of the path matrix to a corresponding cell of the cost matrix.

Supplementary Note 6

The vehicle scheduling apparatus according to supplementary note 5, wherein the update of the cost matrix includes:

generating a grid map that indicates a location of each site, locations of permanent obstacles, and locations of the external conflicts based on the map information and a result of the detection of the external conflict;

updating the path matrix by solving a shortest path problem using the grid map; and setting, for each pair of sites, a cost of the path indicated by a cell of the path matrix to a corresponding cell of the cost matrix.

Supplementary Note 7

The vehicle scheduling apparatus according to supplementary note 4 or 6, wherein the at least one processor is further configured to execute the instructions to:

in the case where two or more target vehicles are assigned to the target person, detect an internal conflict before detecting the external conflict, the internal conflict being a conflict between the target vehicles;

in the case where one or more internal conflicts are detected, further perform:

updating the path matrix by performing an internal conflict resolution to update the path with minimum cost for the pair of sites for which the internal conflict is detected;

repeatedly performing the selection of the task path for each task, the generation of the schedule information, the detection of the internal conflict, and the update of the path matrix until no internal conflict is detected.

Supplementary Note 8

The vehicle scheduling apparatus according to any one of supplementary notes 1 to 7, wherein the at least one processor is further configured to execute the instructions to:

in the case where one or more external conflicts are detected and the temporary obstacle is a vehicle other than the target vehicles, further perform:

checking whether or not an update of the schedule information of the temporary obstacle is acceptable;

in the case where the schedule information of the temporary obstacle is acceptable, repeatedly updating the schedule information of the temporary obstacle until no external conflict is detected instead of repeatedly generating the scheduling information of the target vehicle.

Supplementary Note 9

A control method performed by a computer, comprising:

acquiring a task list information that indicates tasks assigned to a target person to whom at least one target vehicle is assigned, the target vehicle executing each task assigned thereto at a task site corresponding to the task;

determining an execution order of the tasks for each target vehicle by solving a vehicle routing problem using a cost matrix that indicates a minimum cost for each pair of sites in a workspace;

selecting a task path for each task that is a path with minimum cost to travel to the task site of the task based on the determined execution order of the tasks;

generating, for each target vehicle, schedule information of the target vehicle that indicates the execution order of the tasks assigned to the target vehicle and the task path for each task;

detecting an external conflict that is a conflict between the target vehicle and a temporary obstacle whose location varies over time; and in the case where one or more external conflicts are detected, further performing:

updating the cost matrix so as to update the minimum cost of the pair of sites between whom the conflict is detected; and repeatedly performing the determination of the execution order of the tasks, the selection of the task path for each task, the generation of the schedule information, the detection of the conflict, and the update of the cost matrix until no detection between the target vehicle and the temporary obstacle is detected.

Supplementary Note 10

The control method according to supplementary note 9, wherein the detection of the external conflict includes:

acquiring event information for each temporary obstacle that indicates a location of the temporary obstacle for each point of time;

comparing the schedule information of the target vehicle and the event information for each temporary obstacle to determine that the target vehicle conflicts with the temporary obstacle in the case where the target vehicle and the temporary obstacle are scheduled to be located at a same location at a same time as each other.

Supplementary Note 11

The control method according to supplementary note 9 or 10, wherein the execution order of the tasks for each target vehicle is determined by solving a time-dependent vehicle routing problem, the cost matrix is configured to indicate time-dependent costs, and the initialization of the cost matrix includes:

initializing a path matrix by solving a shortest path problem using map information of the workspace, the path matrix indicates, for each pair of sites and for each point of time, a path with minimum cost of one or more possible paths between the sites, the map information indicating a location of each site and locations of permanent obstacles whose location does not vary overtime; and setting, for each pair of sites and each point of time, a cost of the path indicated by a cell of the path matrix to a corresponding cell of the cost matrix.

Supplementary Note 12

The control method according to supplementary note 11, wherein the update of the cost matrix includes:

generating a reservation table that indicates, for each point of time, a location of each site, locations of permanent obstacles, and locations of the external conflicts based on the map information and a result of the detection of the external conflict;

updating the path matrix by solving a shortest path problem using the reservation table; and setting, for each pair of sites and each point of time, a cost of the path indicated by a cell of the path matrix to a corresponding cell of the cost matrix.

Supplementary Note 13

The control method according to supplementary note 9 or 10, wherein the cost matrix is configured to indicate time-independent costs, and the initialization of the cost matrix includes:

initializing a path matrix by solving a shortest path problem using map information of the workspace, the path matrix indicates, for each pair of sites, a path with minimum cost of one or more possible paths between the sites, the map information indicating a location of each site and locations of permanent obstacles whose location does not vary overtime; and setting, for each pair of sites, a cost of the path indicated by a cell of the path matrix to a corresponding cell of the cost matrix.

Supplementary Note 14

The control method according to supplementary note 13, wherein the update of the cost matrix includes:

generating a grid map that indicates a location of each site, locations of permanent obstacles, and locations of the external conflicts based on the map information and a result of the detection of the external conflict;

updating the path matrix by solving a shortest path problem using the grid map; and setting, for each pair of sites, a cost of the path indicated by a cell of the path matrix to a corresponding cell of the cost matrix.

Supplementary Note 15

The control method according to supplementary note 12 or 14, further comprising:

in the case where two or more target vehicles are assigned to the target person, detecting an internal conflict before detecting the external conflict, the internal conflict being a conflict between the target vehicles;

in the case where one or more internal conflicts are detected, further performing:

updating the path matrix by performing an internal conflict resolution to update the path with minimum cost for the pair of sites for which the internal conflict is detected;

repeatedly performing the selection of the task path for each task, the generation of the schedule information, the detection of the internal conflict, and the update of the path matrix until no internal conflict is detected.

Supplementary Note 16

The control method according to any one of supplementary notes 9 to 15, further comprising:

in the case where one or more external conflicts are detected and the temporary obstacle is a vehicle other than the target vehicles, further performing:

checking whether or not an update of the schedule information of the temporary obstacle is acceptable;

in the case where the schedule information of the temporary obstacle is acceptable, repeatedly updating the schedule information of the temporary obstacle until no external conflict is detected instead of repeatedly generating the scheduling information of the target vehicle.

Supplementary Note 17

A non-transitory computer-readable storage medium storing a program which causes a computer to execute:

acquiring a task list information that indicates tasks assigned to a target person to whom at least one target vehicle is assigned, the target vehicle executing each task assigned thereto at a task site corresponding to the task;

determining an execution order of the tasks for each target vehicle by solving a vehicle routing problem using a cost matrix that indicates a minimum cost for each pair of sites in a workspace;

selecting a task path for each task that is a path with minimum cost to travel to the task site of the task based on the determined execution order of the tasks;

generating, for each target vehicle, schedule information of the target vehicle that indicates the execution order of the tasks assigned to the target vehicle and the task path for each task;

detecting an external conflict that is a conflict between the target vehicle and a temporary obstacle whose location varies over time; and in the case where one or more external conflicts are detected, further performing:

updating the cost matrix so as to update the minimum cost of the pair of sites between whom the conflict is detected; and repeatedly performing the determination of the execution order of the tasks, the selection of the task path for each task, the generation of the schedule information, the detection of the conflict, and the update of the cost matrix until no detection between the target vehicle and the temporary obstacle is detected.

Supplementary Note 18

The storage medium according to supplementary note 17, wherein the detection of the external conflict includes:

acquiring event information for each temporary obstacle that indicates a location of the temporary obstacle for each point of time;

comparing the schedule information of the target vehicle and the event information for each temporary obstacle to determine that the target vehicle conflicts with the temporary obstacle in the case where the target vehicle and the temporary obstacle are scheduled to be located at a same location at a same time as each other.

Supplementary Note 19

The storage medium according to supplementary note 17 or 18, wherein the execution order of the tasks for each target vehicle is determined by solving a time-dependent vehicle routing problem, the cost matrix is configured to indicate time-dependent costs, and the initialization of the cost matrix includes:

initializing a path matrix by solving a shortest path problem using map information of the workspace, the path matrix indicates, for each pair of sites and for each point of time, a path with minimum cost of one or more possible paths between the sites, the map information indicating a location of each site and locations of permanent obstacles whose location does not vary overtime; and setting, for each pair of sites and each point of time, a cost of the path indicated by a cell of the path matrix to a corresponding cell of the cost matrix.

Supplementary Note 20

The storage medium according to supplementary note 19, wherein the update of the cost matrix includes:

generating a reservation table that indicates, for each point of time, a location of each site, locations of permanent obstacles, and locations of the external conflicts based on the map information and a result of the detection of the external conflict;

updating the path matrix by solving a shortest path problem using the reservation table; and setting, for each pair of sites and each point of time, a cost of the path indicated by a cell of the path matrix to a corresponding cell of the cost matrix.

Supplementary Note 21

The storage medium according to supplementary note 17 or 18, wherein the cost matrix is configured to indicate time-independent costs, and the initialization of the cost matrix includes:

initializing a path matrix by solving a shortest path problem using map information of the workspace, the path matrix indicates, for each pair of sites, a path with minimum cost of one or more possible paths between the sites, the map information indicating a location of each site and locations of permanent obstacles whose location does not vary overtime; and setting, for each pair of sites, a cost of the path indicated by a cell of the path matrix to a corresponding cell of the cost matrix.

Supplementary Note 22

The storage medium according to supplementary note 21, wherein the update of the cost matrix includes:

generating a grid map that indicates a location of each site, locations of permanent obstacles, and locations of the external conflicts based on the map information and a result of the detection of the external conflict;

updating the path matrix by solving a shortest path problem using the grid map; and setting, for each pair of sites, a cost of the path indicated by a cell of the path matrix to a corresponding cell of the cost matrix.

Supplementary Note 23

The storage medium according to supplementary note 20 or 22, wherein the program causes the computer further execute:

in the case where two or more target vehicles are assigned to the target person, detecting an internal conflict before detecting the external conflict, the internal conflict being a conflict between the target vehicles;

in the case where one or more internal conflicts are detected, further performing:

updating the path matrix by performing an internal conflict resolution to update the path with minimum cost for the pair of sites for which the internal conflict is detected;

repeatedly performing the selection of the task path for each task, the generation of the schedule information, the detection of the internal conflict, and the update of the path matrix until no internal conflict is detected.

Supplementary Note 24

The storage medium according to any one of supplementary notes 17 to 23, wherein the program causes the computer further execute:

in the case where one or more external conflicts are detected and the temporary obstacle is a vehicle other than the target vehicles, further performing:

checking whether or not an update of the schedule information of the temporary obstacle is acceptable;

in the case where the schedule information of the temporary obstacle is acceptable, repeatedly updating the schedule information of the temporary obstacle until no external conflict is detected instead of repeatedly generating the scheduling information of the target vehicle.

This application is based upon and claims the benefit of priority from Japanese patent application No. 2021-165351, filed on Oct. 7, 2021, the disclosure of which is incorporated herein in its entirety by reference.

REFERENCE SIGNS LIST

10 task list information
20 schedule information
30 target vehicle
100 time-dependent cost matrix
110 time-dependent path matrix
120 grid map
1000 computer
1020 bus
1040 processor
1060 memory
1080 storage device
1100 input/output interface
1120 network interface
2000 vehicle scheduling apparatus
2020 acquisition unit
2040 generation unit
2060 conflict detection unit
2080 update unit

What is claimed is:

1. A vehicle scheduling apparatus comprising:

at least one processor; and memory storing instructions;

wherein the at least one processor is configured to execute the instructions to:

acquire a task list information that indicates tasks assigned to a target person to whom at least one target vehicle is assigned, the target vehicle executing each task assigned thereto at a task site corresponding to the task;

determine an execution order of the tasks for each target vehicle by solving a vehicle routing problem using a cost matrix that indicates a minimum cost for each pair of sites in a workspace;

select a task path for each task that is a path with minimum cost to travel to the task site of the task based on the determined execution order of the tasks;

generate, for each target vehicle, schedule information of the target vehicle that indicates the execution order of the tasks assigned to the target vehicle and the task path for each task;

detect an external conflict that is a conflict between the target vehicle and a temporary obstacle whose location varies over time; and in the case where one or more external conflicts are detected, further perform:

updating the cost matrix so as to update the minimum cost of the pair of sites between whom the conflict is detected; and repeatedly performing the determination of the execution order of the tasks, the selection of the task path for each task, the generation of the schedule information, the detection of the conflict, and the update of the cost matrix until no detection between the target vehicle and the temporary obstacle is detected.

2. The vehicle scheduling apparatus according to claim 1, wherein the detection of the external conflict includes:

acquiring event information for each temporary obstacle that indicates a location of the temporary obstacle for each point of time;

comparing the schedule information of the target vehicle and the event information for each temporary obstacle to determine that the target vehicle conflicts with the temporary obstacle in the case where the target vehicle and the temporary obstacle are scheduled to be located at a same location at a same time as each other.

3. The vehicle scheduling apparatus according to claim 1, wherein the execution order of the tasks for each target vehicle is determined by solving a time-dependent vehicle routing problem, the cost matrix is configured to indicate time-dependent costs, and the initialization of the cost matrix includes:

initializing a path matrix by solving a shortest path problem using map information of the workspace, the path matrix indicates, for each pair of sites and for each point of time, a path with minimum cost of one or more possible paths between the sites, the map information indicating a location of each site and locations of permanent obstacles whose location does not vary overtime; and setting, for each pair of sites and each point of time, a cost of the path indicated by a cell of the path matrix to a corresponding cell of the cost matrix.

4. The vehicle scheduling apparatus according to claim 3, wherein the update of the cost matrix includes:

generating a reservation table that indicates, for each point of time, a location of each site, locations of permanent obstacles, and locations of the external conflicts based on the map information and a result of the detection of the external conflict;

updating the path matrix by solving a shortest path problem using the reservation table; and setting, for each pair of sites and each point of time, a cost of the path indicated by a cell of the path matrix to a corresponding cell of the cost matrix.

5. The vehicle scheduling apparatus according to claim 4, wherein the at least one processor is further configured to execute the instructions to:

in the case where two or more target vehicles are assigned to the target person, detect an internal conflict before detecting the external conflict, the internal conflict being a conflict between the target vehicles;

in the case where one or more internal conflicts are detected, further perform:

updating the path matrix by performing an internal conflict resolution to update the path with minimum cost for the pair of sites for which the internal conflict is detected;

repeatedly performing the selection of the task path for each task, the generation of the schedule information, the detection of the internal conflict, and the update of the path matrix until no internal conflict is detected.

6. The vehicle scheduling apparatus according to claim 1, wherein the cost matrix is configured to indicate time-independent costs, and the initialization of the cost matrix includes:

initializing a path matrix by solving a shortest path problem using map information of the workspace, the path matrix indicates, for each pair of sites, a path with minimum cost of one or more possible paths between the sites, the map information indicating a location of each site and locations of permanent obstacles whose location does not vary overtime; and setting, for each pair of sites, a cost of the path indicated by a cell of the path matrix to a corresponding cell of the cost matrix.

7. The vehicle scheduling apparatus according to claim 6, wherein the update of the cost matrix includes:

generating a grid map that indicates a location of each site, locations of permanent obstacles, and locations of the external conflicts based on the map information and a result of the detection of the external conflict;

updating the path matrix by solving a shortest path problem using the grid map; and setting, for each pair of sites, a cost of the path indicated by a cell of the path matrix to a corresponding cell of the cost matrix.

8. The vehicle scheduling apparatus according to claim 1, wherein the at least one processor is further configured to execute the instructions to:

in the case where one or more external conflicts are detected and the temporary obstacle is a vehicle other than the target vehicles, further perform:

checking whether or not an update of the schedule information of the temporary obstacle is acceptable;

in the case where the schedule information of the temporary obstacle is acceptable, repeatedly updating the schedule information of the temporary obstacle until no external conflict is detected instead of repeatedly generating the scheduling information of the target vehicle.

9. A control method performed by a computer, comprising:

acquiring a task list information that indicates tasks assigned to a target person to whom at least one target vehicle is assigned, the target vehicle executing each task assigned thereto at a task site corresponding to the task;

determining an execution order of the tasks for each target vehicle by solving a vehicle routing problem using a cost matrix that indicates a minimum cost for each pair of sites in a workspace;

selecting a task path for each task that is a path with minimum cost to travel to the task site of the task based on the determined execution order of the tasks;

generating, for each target vehicle, schedule information of the target vehicle that indicates the execution order of the tasks assigned to the target vehicle and the task path for each task;

detecting an external conflict that is a conflict between the target vehicle and a temporary obstacle whose location varies over time; and in the case where one or more external conflicts are detected, further performing:

updating the cost matrix so as to update the minimum cost of the pair of sites between whom the conflict is detected; and repeatedly performing the determination of the execution order of the tasks, the selection of the task path for each task, the generation of the schedule information, the detection of the conflict, and the update of the cost matrix until no detection between the target vehicle and the temporary obstacle is detected.

10. The control method according to claim 9, wherein the detection of the external conflict includes:

acquiring event information for each temporary obstacle that indicates a location of the temporary obstacle for each point of time;

comparing the schedule information of the target vehicle and the event information for each temporary obstacle to determine that the target vehicle conflicts with the temporary obstacle in the case where the target vehicle and the temporary obstacle are scheduled to be located at a same location at a same time as each other.

11. The control method according to claim 9, wherein the execution order of the tasks for each target vehicle is determined by solving a time-dependent vehicle routing problem, the cost matrix is configured to indicate time-dependent costs, and the initialization of the cost matrix includes:

initializing a path matrix by solving a shortest path problem using map information of the workspace, the path matrix indicates, for each pair of sites and for each point of time, a path with minimum cost of one or more possible paths between the sites, the map information indicating a location of each site and locations of permanent obstacles whose location does not vary overtime; and setting, for each pair of sites and each point of time, a cost of the path indicated by a cell of the path matrix to a corresponding cell of the cost matrix.

12. The control method according to claim 11, wherein the update of the cost matrix includes:

generating a reservation table that indicates, for each point of time, a location of each site, locations of permanent obstacles, and locations of the external conflicts based on the map information and a result of the detection of the external conflict;

updating the path matrix by solving a shortest path problem using the reservation table; and setting, for each pair of sites and each point of time, a cost of the path indicated by a cell of the path matrix to a corresponding cell of the cost matrix.

13. The control method according to claim 9, wherein the cost matrix is configured to indicate time-independent costs, and the initialization of the cost matrix includes:

initializing a path matrix by solving a shortest path problem using map information of the workspace, the path matrix indicates, for each pair of sites, a path with minimum cost of one or more possible paths between the sites, the map information indicating a location of each site and locations of permanent obstacles whose location does not vary overtime; and setting, for each pair of sites, a cost of the path indicated by a cell of the path matrix to a corresponding cell of the cost matrix.

14. The control method according to claim 13, wherein the update of the cost matrix includes:

generating a grid map that indicates a location of each site, locations of permanent obstacles, and locations of the external conflicts based on the map information and a result of the detection of the external conflict;

updating the path matrix by solving a shortest path problem using the grid map; and setting, for each pair of sites, a cost of the path indicated by a cell of the path matrix to a corresponding cell of the cost matrix.

15. A non-transitory computer-readable storage medium storing a program which causes a computer to execute:

acquiring a task list information that indicates tasks assigned to a target person to whom at least one target vehicle is assigned, the target vehicle executing each task assigned thereto at a task site corresponding to the task;

determining an execution order of the tasks for each target vehicle by solving a vehicle routing problem using a cost matrix that indicates a minimum cost for each pair of sites in a workspace;

selecting a task path for each task that is a path with minimum cost to travel to the task site of the task based on the determined execution order of the tasks;

generating, for each target vehicle, schedule information of the target vehicle that indicates the execution order of the tasks assigned to the target vehicle and the task path for each task;

detecting an external conflict that is a conflict between the target vehicle and a temporary obstacle whose location varies over time; and in the case where one or more external conflicts are detected, further performing:

updating the cost matrix so as to update the minimum cost of the pair of sites between whom the conflict is detected; and repeatedly performing the determination of the execution order of the tasks, the selection of the task path for each task, the generation of the schedule information, the detection of the conflict, and the update of the cost matrix until no detection between the target vehicle and the temporary obstacle is detected.

16. The storage medium according to claim 15, wherein the cost matrix is configured to indicate time-independent costs, and the initialization of the cost matrix includes:

initializing a path matrix by solving a shortest path problem using map information of the workspace, the path matrix indicates, for each pair of sites, a path with minimum cost of one or more possible paths between the sites, the map information indicating a location of each site and locations of permanent obstacles whose location does not vary overtime; and setting, for each pair of sites, a cost of the path indicated by a cell of the path matrix to a corresponding cell of the cost matrix.

17. The storage medium according to claim 16, wherein the update of the cost matrix includes:

generating a grid map that indicates a location of each site, locations of permanent obstacles, and locations of the external conflicts based on the map information and a result of the detection of the external conflict;

updating the path matrix by solving a shortest path problem using the grid map; and setting, for each pair of sites, a cost of the path indicated by a cell of the path matrix to a corresponding cell of the cost matrix.

18. The storage medium according to claim 15, wherein the detection of the external conflict includes:

acquiring event information for each temporary obstacle that indicates a location of the temporary obstacle for each point of time;

comparing the schedule information of the target vehicle and the event information for each temporary obstacle to determine that the target vehicle conflicts with the temporary obstacle in the case where the target vehicle and the temporary obstacle are scheduled to be located at a same location at a same time as each other.

19. The storage medium according to claim 15, wherein the execution order of the tasks for each target vehicle is determined by solving a time-dependent vehicle routing problem, the cost matrix is configured to indicate time-dependent costs, and the initialization of the cost matrix includes:

initializing a path matrix by solving a shortest path problem using map information of the workspace, the path matrix indicates, for each pair of sites and for each point of time, a path with minimum cost of one or more possible paths between the sites, the map information indicating a location of each site and locations of permanent obstacles whose location does not vary overtime; and setting, for each pair of sites and each point of time, a cost of the path indicated by a cell of the path matrix to a corresponding cell of the cost matrix.

20. The storage medium according to claim 19, wherein the update of the cost matrix includes:

generating a reservation table that indicates, for each point of time, a location of each site, locations of permanent obstacles, and locations of the external conflicts based on the map information and a result of the detection of the external conflict;

updating the path matrix by solving a shortest path problem using the reservation table; and setting, for each pair of sites and each point of time, a cost of the path indicated by a cell of the path matrix to a corresponding cell of the cost matrix.

* * * * *